(12) United States Patent
Zhong et al.

(10) Patent No.: US 10,474,921 B2
(45) Date of Patent: Nov. 12, 2019

(54) TRACKER ASSISTED IMAGE CAPTURE

(71) Applicant: QUALCOMM Incorporated, San Diego, CA (US)

(72) Inventors: Xin Zhong, San Diego, CA (US); Dashan Gao, San Diego, CA (US); Ning Bi, San Diego, CA (US); Steven Douglas Laver, San Diego, CA (US); Scott David Beith, San Diego, CA (US); Diarmuid MacCormack, Montreal (CA)

(73) Assignee: QUALCOMM Incorporated, San Diego, CA (US)

( * ) Notice: Subject to any disclaimer, the term of this patent is extended or adjusted under 35 U.S.C. 154(b) by 669 days.

(21) Appl. No.: 14/036,947

(22) Filed: Sep. 25, 2013

(65) Prior Publication Data

US 2014/0369555 A1    Dec. 18, 2014

Related U.S. Application Data

(60) Provisional application No. 61/835,414, filed on Jun. 14, 2013.

(51) Int. Cl.
 *G06K 9/32* (2006.01)
 *G11B 27/02* (2006.01)
 (Continued)

(52) U.S. Cl.
 CPC ....... *G06K 9/3233* (2013.01); *G06K 9/00765* (2013.01); *G06T 7/20* (2013.01); *G08B 13/196* (2013.01); *G11B 27/02* (2013.01); *H04N 5/23222* (2013.01); *H04N 5/23238* (2013.01); *H04N 5/23254* (2013.01); *H04N 5/23293* (2013.01)

(58) Field of Classification Search
 CPC ......... G06T 2207/10016; G06F 3/0481; G06F 9/4443; G06K 9/3233; G11B 27/02
 See application file for complete search history.

(56) References Cited

U.S. PATENT DOCUMENTS 6,954,544 B2   10/2005 Jepson et al.
8,209,628 B1 *  6/2012 Davidson .............. G06F 3/0487
                                              715/790
(Continued)

FOREIGN PATENT DOCUMENTS

| CN | 101887588 A | 11/2010 |
| CN | 102214359 A | 10/2011 |

(Continued)

OTHER PUBLICATIONS

International Search Report and Written Opinion—PCT/US2014/040166—ISA/EPO—dated Sep. 10, 2014.

(Continued)

*Primary Examiner* — Obafemi O Sosanya
(74) *Attorney, Agent, or Firm* — Austin Rapp & Hardman, P.C.

(57) ABSTRACT

A method for picture processing is described. A first tracking area is obtained. A second tracking area is also obtained. The method includes beginning to track the first tracking area and the second tracking area. Picture processing is performed once a portion of the first tracking area overlapping the second tracking area passes a threshold.

41 Claims, 18 Drawing Sheets

(51) Int. Cl.
*G06K 9/00* (2006.01)
*G06T 7/20* (2017.01)
*H04N 5/232* (2006.01)
*G08B 13/196* (2006.01)

(56) References Cited

U.S. PATENT DOCUMENTS

| | | | |
|---|---|---|---|
| 8,805,008 | B1 | 8/2014 | Gillis et al. |
| 9,201,499 | B1 * | 12/2015 | Chang ............... G06F 3/011 |
| 2004/0061781 | A1 * | 4/2004 | Fennell ........... G08B 13/19602 |
| | | | 348/169 |
| 2009/0087039 | A1 | 4/2009 | Matsuura |
| 2010/0104199 | A1 | 4/2010 | Zhang et al. |
| 2010/0165153 | A1 | 7/2010 | Kai et al. |
| 2010/0225773 | A1 | 9/2010 | Lee |
| 2011/0001824 | A1 * | 1/2011 | Chang ................... H04N 7/183 |
| | | | 348/143 |
| 2011/0102678 | A1 * | 5/2011 | House ................... H04N 9/75 |
| | | | 348/584 |
| 2011/0200259 | A1 * | 8/2011 | Lindskog ............... G06T 11/00 |
| | | | 382/201 |
| 2012/0129605 | A1 | 5/2012 | Livet |
| 2012/0169871 | A1 * | 7/2012 | Sablak ................... H04N 7/18 |
| | | | 348/143 |
| 2013/0004100 | A1 * | 1/2013 | Putraya ............... G06T 3/4038 |
| | | | 382/284 |
| 2013/0330060 | A1 * | 12/2013 | Seidel ................ G06T 17/10 |
| | | | 386/280 |
| 2013/0343604 | A1 * | 12/2013 | Adachi .............. G06K 9/00711 |
| | | | 382/103 |
| 2014/0136098 | A1 * | 5/2014 | Stroila ................... G01C 11/04 |
| | | | 701/408 |
| 2014/0192210 | A1 * | 7/2014 | Gervautz ............... G06K 9/228 |
| | | | 348/207.1 |

FOREIGN PATENT DOCUMENTS

| | | |
|---|---|---|
| CN | 103139547 A | 6/2013 |
| EP | 1182465 B1 | 10/2006 |
| EP | 2107524 A2 | 10/2009 |
| JP | 2004072685 A | 3/2004 |
| JP | 2010114801 A | 5/2010 |
| JP | 2011205282 A | 10/2011 |
| WO | WO-2008010762 A1 | 1/2008 |
| WO | 2008102522 A1 | 8/2008 |
| WO | 2008129758 A1 | 10/2008 |
| WO | WO-2012173466 A1 | 12/2012 |

OTHER PUBLICATIONS

Yilmaz A., et al., "Object tracking", ACM Computing Surveys, vol. 38, No. 4, Dec. 25, 2006 (Dec. 25, 2006), pp. 1-45, XP055053833, ISSN: 0360-0300, DOI:10.1145/1177352.1177355, the whole document.

Faliang C., et al., "Human Oriented Multi-Target Tracking Algorithm in Video Sequence", Control and Decision, Apr. 4, 2007, vol. 22, No. 4, pp. 418-422.

Zhiguo Z., "Occluded Moving Objects Extraction and Reconstruction in Video Monitoring System", China Master's Technology-Related Theses Collection, Jul. 15, 2008, pp. 33-46.

\* cited by examiner

TRACKER ASSISTED IMAGE CAPTURE

CROSS-REFERENCE TO RELATED APPLICATIONS

This application is related to and claims priority from U.S. Provisional Patent Application Ser. No. 61/835,414, filed Jun. 14, 2013, for "TRACKER ASSISTED IMAGE CAPTURE."

TECHNICAL FIELD

The present disclosure relates generally to electronic devices. More specifically, the present disclosure relates to systems and methods for tracker assisted image capture.

BACKGROUND

In the last several decades, the use of electronic devices has become common. In particular, advances in electronic technology have reduced the cost of increasingly complex and useful electronic devices. Cost reduction and consumer demand have proliferated the use of electronic devices such that they are practically ubiquitous in modern society. As the use of electronic devices has expanded, so has the demand for new and improved features of electronic devices. More specifically, electronic devices that perform new functions and/or that perform functions faster, more efficiently or with higher quality are often sought after.

Some electronic devices (e.g., cameras, video camcorders, digital cameras, cellular phones, smart phones, computers, televisions, etc.) capture or utilize images. For example, a digital camera may capture a digital image.

New and/or improved features of electronic devices are often sought for. As can be observed from this discussion, systems and methods that add new and/or improved features of electronic devices may be beneficial.

SUMMARY

A method for picture processing is described. A first tracking area is obtained. A second tracking area is also obtained. The method includes beginning to track the first tracking area and the second tracking area. Picture processing is performed once a portion of the first tracking area overlapping the second tracking area passes a threshold.

The picture processing may be performed once the portion of the first tracking area overlapping the second tracking area becomes greater than the threshold. The picture processing may also be performed once the portion of the first tracking area overlapping the second tracking area becomes less than the threshold. The picture processing may include capturing a photograph. The photograph may be captured from prerecorded video footage or from footage. The picture processing may also include editing a video sequence. An object tracked by the first tracking area may be removed from the video sequence.

It may be determined that the first tracking area is overlapping the second tracking area by more than the threshold in a first frame of the video sequence. A second frame of the video sequence may be selected. The first tracking area may not overlap the second tracking area in the second frame. The first tracking area in the first frame may be replaced with a corresponding replacement area from the second frame.

The second frame may occur later in time than the first frame. The second frame may also occur earlier in time than the first frame. The edited first frame may be stored as part of an edited video sequence. The first tracking area and the second tracking area may be entered by a user via a focus ring. Beginning to track the first tracking area and the second tracking area may occur after a user has released a finger from a touchscreen. The second tracking area may include an action line.

An electronic device configured for picture processing is also described. The electronic device includes a processor, memory in electronic communication with the processor and instructions stored in memory. The instructions are executable to obtain a first tracking area. The instructions are also executable to obtain a second tracking area. The instructions are further executable to begin to track the first tracking area and the second tracking area. The instructions are also executable to perform picture processing once a portion of the first tracking area overlapping the second tracking area passes a threshold.

An apparatus for picture processing is described. The apparatus includes means for obtaining a first tracking area. The apparatus also includes means for obtaining a second tracking area. The apparatus further includes means for beginning to track the first tracking area and the second tracking area. The apparatus also includes means for performing picture processing once a portion of the first tracking area overlapping the second tracking area passes a threshold.

A computer-program product for picture processing is also described. The computer-program product includes a non-transitory computer-readable medium having instructions thereon. The instructions include code for causing an electronic device to obtain a first tracking area. The instructions also include code for causing the electronic device to obtain a second tracking area. The instructions further include code for causing the electronic device to begin to track the first tracking area and the second tracking area. The instructions also include code for causing the electronic device to perform picture processing once a portion of the first tracking area overlapping the second tracking area passes a threshold.

DETAILED DESCRIPTION

Tracking an object within an image or a user-defined region of interest within that image using a camera from a mobile platform (e.g., tablets, phones) may be difficult. Real-time performance (~30 frames per second (fps)) may be required. Some configurations may combine the output of an optical flow-based tracker and an image content-based detector to obtain robust tracking. However, the computation of the existing algorithms may be prohibitive for mobile platforms to achieve real-time performance.

The present systems and methods may implement the following techniques to improve the speed of the tracking and detection algorithms: (1) using a fraction of possible detection windows at each frame, (e.g. randomly select the window positions); (2) selecting only a few spatial scales for object detection that are close to previous detected target size; (3) based on the confidence value of previous tracking, determining either to search the object in partial or the entire image; (4) dynamically adjusting the number of the detection windows based on previous tracking results; (5) instead of running the tracker and object detector in parallel, applying the tracker first, since it is less computationally expensive; and (6) running an object detector only when the confidence of the tracker is lower than a certain threshold. One of the technical advantages is to reduce computations used to track and/or detect a target object.

One particular use of tracking and detection algorithms is picture processing. Picture processing may include taking a photograph and/or video editing. Implementing picture processing may provide real-world use applications of the tracking and detection algorithms described.

As used herein, the term "track" and its variants refer to a process that is motion-based, not identifying a specific object. For example, an object tracking and detection module may track motion from frame to frame and determine a location, size or frame of the target object based on movement of an electronic device (e.g., if the camera is panning) or movements of objects from frame to frame. The term "detect" and its variants refers to a process that attempts to identify a target object, e.g., by comparing a portion of a frame to a reference image. For example, an object tracking and detection module may compare portions of captured frames to a reference image (of the target object) in an attempt to identify a target object. In one example, detection may be used when a target can no longer be tracked (e.g., if an object falls outside the field of view). Systems and methods of performing motion-based tracking and object detection are explained in greater detail below.

Figure 1:
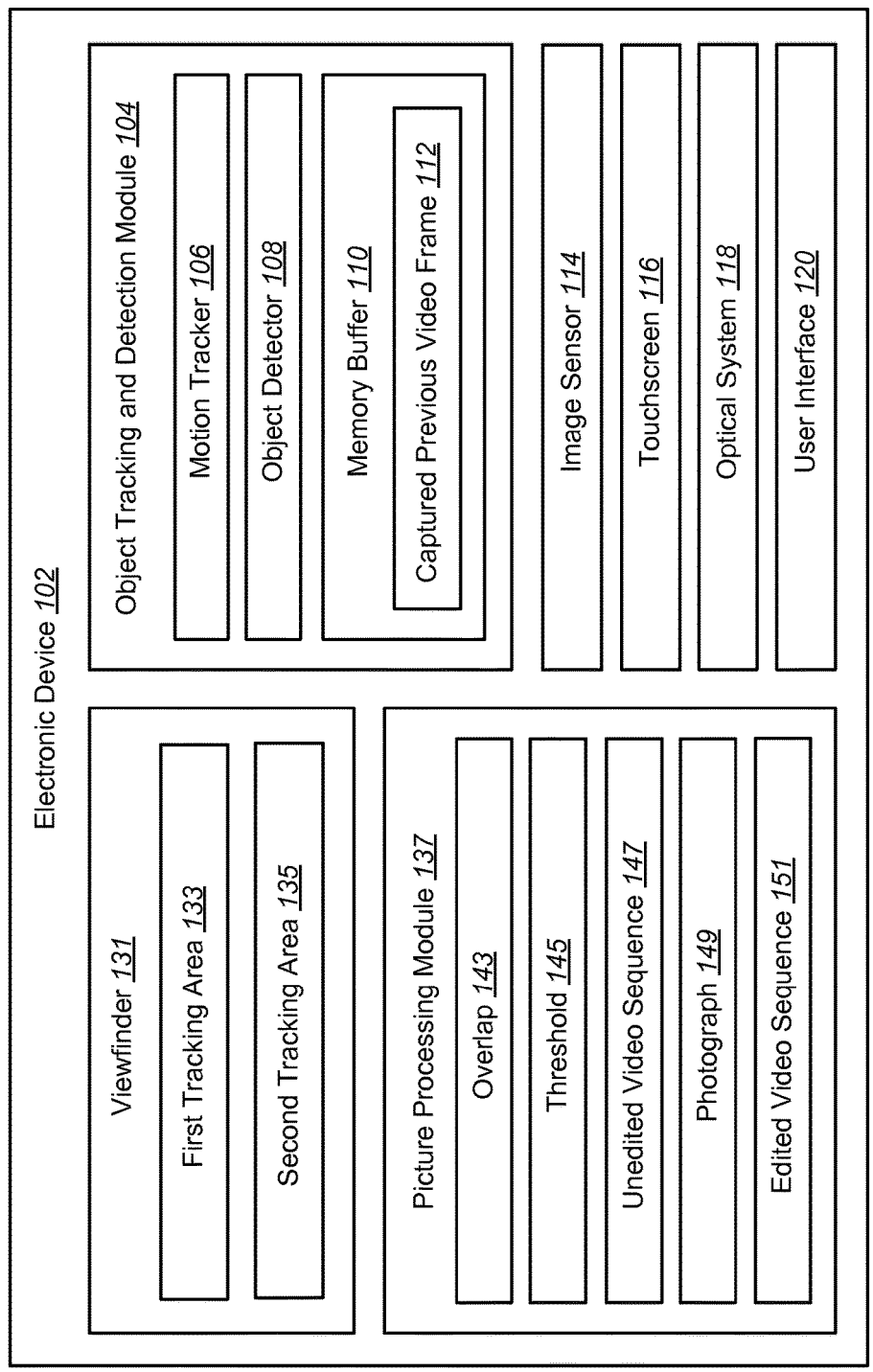
FIG. 1 is a block diagram illustrating an electronic device for use in the present systems and methods.

FIG. 1 is a block diagram illustrating an electronic device 102 for use in the present systems and methods. The electronic device 102 may also be referred to as a wireless communication device, mobile device, mobile station, subscriber station, client, client station, user equipment (UE), remote station, access terminal, mobile terminal, terminal, user terminal, subscriber unit, etc. Examples of electronic devices include laptop or desktop computers, cellular phones, smart phones, wireless modems, e-readers, tablet devices, gaming systems, etc. Some of these devices may operate in accordance with one or more industry standards.

An electronic device 102, such as a smartphone or tablet computer, may include a camera. The camera may include an image sensor 114 and an optical system 118 (e.g., lenses) that focuses images of objects that are located within the field of view of the optical system 118 onto the image sensor 114. An electronic device 102 may also include a camera software application and a display screen. When the camera application is running, images of objects that are located within the field of view of the optical system 118 may be recorded by the image sensor 114. The images that are being recorded by the image sensor 114 may be displayed on the display screen. These images may be displayed in rapid succession at a relatively high frame rate so that, at any given moment in time, the objects that are located within the field of view of the optical system 118 are displayed on the display screen. Although the present systems and methods are described in terms of captured video frames, the techniques discussed herein may be used on any digital image. Therefore, the terms video frame and digital image may be used interchangeably herein.

A user interface 120 of the camera application may permit one or more objects that are being displayed on the display screen to be tracked. The user of the electronic device 102 may be permitted to select the object(s) that is/are to be tracked. Further, the selected object(s) may be used as a reference for later detecting the object.

In one configuration, the display is a touchscreen 116 that receives input from physical touch, e.g., by a finger, stylus or other tool. The touchscreen 116 may receive touch input defining a target object to be tracked. For example, if the electronic device 102 is capturing a nature scene that includes an animal of interest, a user may draw a bounding box around the animal indicating a desire that the animal be tracked, or detected, if necessary. Target objects may be selected in any suitable way. For example, facial recognition, pedestrian recognition, etc., may be used to select a target object that is to be tracked, detected, or both. In one configuration, multiple objects may be tracked. A user interface 120 may allow a user to interact with an object tracking and detection module 104, e.g., to select (i.e., define) one or more target objects. The touchscreen 116 may include a viewfinder 131. The viewfinder 131 may refer to the portion of the touchscreen 116 that displays a video stream or a live feed. For example, the viewfinder 131 may display the view obtained by a camera on the electronic device 102.

The electronic device 102 may include an object tracking and detection module 104 for tracking a selected object and/or detecting the object in a video frame. The object tracking and detection module 104 may include a motion tracker 106 for tracking one or more objects. The motion tracker 106 may be motion-based for tracking motion of points on an image (e.g., a video frame) from frame to frame to estimate the location and/or change of location of a target object between a previous video frame and a current video frame.

The object tracking and detection module 104 may also include an object detector 108 for detecting an object on a video frame. The object detector 108 may use an object model, rather than a motion-based model, to detect an object by comparing all or a portion of a current video frame to a selected object or portion of a captured previous video frame 112 (e.g., in a sequence of video frames). The object detector 108 may be used for detecting multiple objects within a video frame.

The object tracking and detection module 104 may also include a memory buffer 110. The memory buffer 110 may store one or more captured frames and data associated with the captured video frames. In one example, the memory buffer 110 may store a previous captured video frame 112. The object tracking and detection module 104 may use data provided from the memory buffer 110 about a captured previous video frame 112 in performing motion-based tracking and/or object detection. Data may be provided to the motion tracker 106 or object detector 108 via feedback from the memory buffer 110 in order to tailor motion-based tracking and object detection to more accurately track and/or detect a target object. For example, the memory buffer 110 may provide location and window size data to the motion tracker 106 and the object detector 108 to provide the motion tracker 106 and object detector 108 with one or more parameters that may be used to more accurately pinpoint a location and size of an object when tracking or detecting the object.

As stated above, the electronic device 102 may perform motion-based tracking. Motion-based tracking may be performed using a variety of methods. In one example, tracking is performed by a median flow method in which the motion tracker 106 accepts a pair of images $I_t$, $I_{t+1}$ (e.g., video frames) and a bounding box $\beta_t$ and outputs a bounding box $\beta_{t+1}$. A set of points may be initialized on a rectangular grid within the bounding box $\beta_t$ and tracks the points to generate a sparse motion flow between $I_t$ and $I_{t+1}$. A quality of the point prediction may be estimated and each point assigned an error. A portion (e.g., 50%) of the worst predictions may be filtered out while the remaining predictions are used to estimate the displacement of the whole bounding box. The motion tracker 106 may perform motion-based tracking on each video frame captured by an electronic device 102. In a similar method, motion-based tracking may be performed by calculating one or more gradients (e.g., x and y gradients) and using the difference between a pair of frames to calculate a time gradient and using the multiple gradient values to accurately track a target object within a current video frame. Further details regarding motion-based tracking are provided below.

When performing motion-based tracking, the motion tracker 106 may determine a tracking confidence value based on a calculated or estimated accuracy of the motion-tracking method. In some configurations, the tracking confidence value may be a real number between 0 and 1 corresponding to a likelihood or probability that a target object falls within a current video frame or a defined window of the video frame. The tracking confidence value may be compared to a tracking threshold. If the tracking confidence value is greater than the tracking threshold, the likelihood may be high that the target object is found within the current video frame. Alternatively, if the tracking confidence value is less than or equal to a tracking threshold, the likelihood may be low or uncertain whether the target object is found within the current video frame. Various methods for determining a tracking confidence value may be used. In one configuration, the tracking confidence value is determined by calculating a normalized cross correlation (NCC) between a tracked window (e.g., a tracking patch window) in a current video frame and previously stored image patches from previously captured video frames. Further details regarding determining a tracking confidence value are provided below.

The electronic device 102 may also perform object detection. Object detection may be performed using a variety of methods. In one configuration, object detection is performed using a sliding window method in which the content of multiple subsets of windows within a video frame are viewed to determine whether a target object is found in a current video frame or within a particular window or subset of windows of the current video frame. All or a subset of all possible window locations and sizes may be searched in a video frame. For example, each window may correspond to pixels of data and the object detector 108 may perform one or more computations using the pixels of data to determine a level of confidence (e.g., a binary indicator) that the target object is within a particular window or subwindow. Based on the level of confidence associated with one or more windows, a detector confidence value may be obtained for a current video frame. Further, additional techniques may be used for increasing the accuracy or efficiency of the object detection. Some of these techniques are explained below.

In some configurations, the motion tracker 106 and object detector 108 may operate sequentially rather than in parallel. For example, the electronic device 102 may perform motion-based tracking of a selected object (e.g., target object) and sequentially perform object detection of the selected object based on a tracked parameter. In one configuration, the electronic device 102 may perform motion-based tracking on a current video frame. The electronic device 102 may then perform object detection on the current frame based on a tracked parameter. In one configuration, the tracked parameter may be based on a comparison between a confidence value and a threshold. For example, if a tracking confidence value is below a tracking threshold, the electronic device 102 may perform object detection. Alternatively, if a tracking confidence value is above a tracking threshold, the electronic device 102 may skip object detection for a current video frame and continue performing motion-based tracking on a next video frame based on the motion tracking results of the current video frame. In other words, object detection may be performed only when the motion-based tracking is not very good, e.g., tracking confidence value is below a tracking threshold. Other tracked parameters may be used when considering whether and/or how object detection is performed. Examples of tracked parameters may include a region of a target object, a window location, a window size, a scale level, a target size, a tracking and/or detection confidence value or other parameter that may be used to facilitate efficient tracking and/or detection of a target object.

Sequentially performing motion-based tracking and object detection based on a tracked parameter may enable the electronic device 102 to track and/or detect a target object within a video frame without performing extensive computations. Specifically, because motion-based tracking may be less computationally intensive than object detection, an electronic device 102 may skip performing object detection where motion-based tracking may be used to accurately track a target object within a current video frame. For example, if an electronic device 102 determines that a tracking confidence value exceeds a specific target threshold, the electronic device 102 may determine that object detection is not needed on a current video frame to accurately determine the location or presence of a target object within the current video frame. Further, because object detection may be beneficial in many cases, the electronic device 102 may determine cases in which object detection may be used to more accurately detect a target object or to perform object detection in cases where motion-based tracking is inadequate based on a comparison to a tracking threshold value.

In some configurations, rather than skipping object detection on a current video frame, the results of the motion-based tracking and/or additional information provided by the memory buffer 110 may be used to narrow or tailor the process of performing object detection. For example, where a target object cannot be accurately tracked using a motion-based tracking method, the electronic device 102 may still estimate or obtain information about the location, window scale or other tracked parameter associated with a target object that may be used during object detection to more accurately detect an object using less computational power than without the parameters provided via motion-based tracking. Therefore, even in cases where the motion-based tracking does not provide a tracking confidence value exceeding a tracking threshold, the results of the motion-based tracking may be used when subsequently performing object detection.

The viewfinder 131 on the electronic device 102 may include a first tracking area 133 and a second tracking area 135. Both the first tracking area 133 and the second tracking area 135 may be specified by a user using the touchscreen 116. For example, a user may drag a focus ring on the touchscreen 116 to the desired locations of the first tracking area 133 and the second tracking area 135. Although not required, one of the tracking areas may be stationary. For example, the first tracking area 133 may follow a person walking and the second tracking area 135 may cover a stationary tree. In one configuration, the second tracking area 135 may cover the entire touchscreen 116 on the electronic device 102.

The electronic device 102 may include a picture processing module 137. The picture processing module 137 may provide different types of picture processing, such as taking a photograph or editing prerecorded video. The picture processing module 137 may include an overlap 143. The overlap 143 may reflect the amount of overlap between the first tracking area 133 and the second tracking area 135. For example, the overlap 143 may be 0% if the first tracking area 133 and the second tracking area 135 do not overlap each other at all. Likewise, the overlap 143 may be 100% if the first tracking area 133 completely overlaps the second tracking area 135 (or if the second tracking area 135 completely overlaps the first tracking area 133, depending on which tracking area is larger).

The picture processing module 137 may include a threshold 145. The overlap 143 may be compared with the threshold 145 to determine whether picture processing should be performed. For example, a photograph 149 may be taken when the overlap 143 becomes greater than the threshold 145. As another example, a photograph 149 may be taken when the overlap 143 becomes less than the threshold 145. In yet another example, video editing may be performed when the overlap 143 becomes greater than or less than the threshold 145. In one example of video editing, frames in an unedited video sequence 147 may be edited to obtain an edited video sequence 151.

Figure 2A:
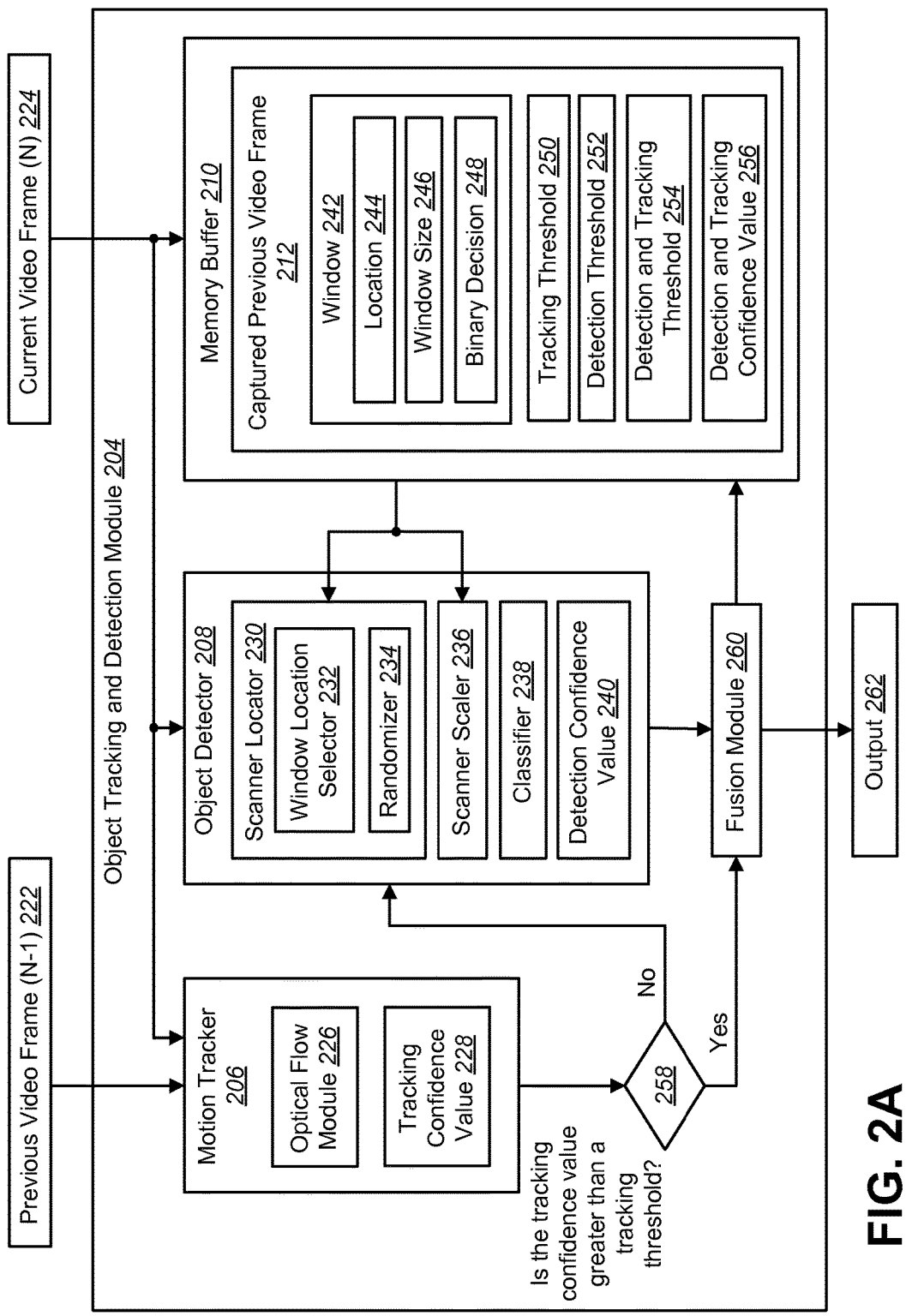
FIG. 2A is a block diagram illustrating an object tracking and detection module.

FIG. 2A is a block diagram illustrating an object tracking and detection module 204. The object tracking and detection module 204 may be implemented within an electronic or wireless device. The object tracking and detection module 204 may include a motion tracker 206 having an optical flow module 226 and a tracking confidence value 228. The object tracking and detection module 204 may also include an object detector 208 having a scanner locator 230, scanner scaler 236, classifier 238 and a detection confidence value 240. The memory buffer 210 may store data associated with a captured previous video frame 212 that may be provided to the motion tracker 206 and object detector 208. The object tracking and detection module 204, motion tracker 206, object detector 208 and memory buffer 210 may be configurations of the object tracking and detection module 104, motion tracker 106, object detector 108 and memory buffer 110 described above in connection with FIG. 1.

The motion tracker 206 may be used to perform motion-based tracking on a current video frame (N) 224. For example, a previous video frame (N−1) 222 and a current video frame (N) 224 may be received (e.g., by the electronic device 102). The previous video frame (N−1) 222 may immediately precede a current video frame (N) 224 in a sequence of video frames. Additional video frames may be obtained and processed by the object tracking and detection module 204. The previous video frame (N−1) 222 may be provided to a motion tracker 206. Further, the memory buffer 210 may store data associated with the previous video frame (N−1) 222, referred to herein as a captured previous video frame 212. In some configurations, the memory buffer 210 may obtain information about the previous video frame (N−1) 222 directly from the electronic device 102 (e.g., from the camera). The memory buffer 210 may also obtain tracking results about the previous video frame (N−1) 222 from the fusion module 260 which may specify where an object was tracked and/or detected in the previous video frame (N−1) 222. This information about the previous video frame (N−1) 222 or other previously captured video frames may be stored in the memory buffer 210.

The motion tracker 206 may subsequently receive a current video frame (N) 224 in a sequence of video frames. The motion tracker 206 may compare the current video frame (N) 224 to the previous video frame (N−1) 222 (e.g., using information provided from the memory buffer 210). The motion tracker 206 may track motion of an object on the current video frame (N) 224 using an optical flow module 226. The optical flow module 226 may include hardware and/or software for performing motion-based tracking of an object on a current video frame (N) 224. By comparing the previous video frame (N−1) 222 and the current video frame (N) 224, the motion tracker 206 may determine a tracking confidence value 228 associated with the likelihood that a target object is in the current video frame (N) 224. In one example, the tracking confidence value 228 is a real number (e.g., between 0 and 1) based on a percentage of certainty that the target object is within the current video frame (N) 224 or a window within the current video frame (N) 224.

The object detector 208 may be used to detect an object on a current video frame (N) 224. For example, the object detector 208 may receive a current video frame (N) 224 in a sequence of video frames. The object detector 208 may perform object detection on the current video frame (N) 224 based on a tracked parameter. The tracked parameter may include a tracking confidence value 228 corresponding to a likelihood that a target object is being accurately tracked. More specifically, a tracked parameter may include a comparison of the tracking confidence value 228 to a tracking threshold 250. The tracked parameter may also include information provided from the memory buffer 210. Some examples of tracked parameters that may be used when detecting an object include a region, a window location, a window size, or other information that may be used by the object detector 208 as a parameter when performing object detection.

The object detector 208 may include a scanner locator 230. The scanner locator 230 may include a window location selector 232 and a randomizer 234. The window location selector 232 may select multiple windows within a video frame. For example, a video frame may include multiple windows, each with an associated location and size. In one configuration, each video frame is divided into multiple (e.g., approximately 10,000) overlapping windows, each including a fraction of the total pixels in the video frame. Alternatively, there may be any suitable number of windows and they may not overlap. The window location selector 232 within the scanner locator 230 may select the location of a window in which to attempt to identify a target object. The randomizer 234 may randomly select windows of varying sizes and locations for detecting an object. In some configurations, the randomizer 234 randomly selects windows within a video frame. Alternatively, the randomizer 234 may more precisely select windows based on one or more factors. For example, the randomizer 234 may limit the selection of windows based on a region, size or general location of where an object is most likely located. This information may be obtained via the memory buffer 210 or may be obtained via the motion-based tracking that, while not accurate enough to be relied on entirely, may provide information that is helpful when performing object detection. Therefore, while the randomizer 234 may randomly select multiple windows to search, the selection of windows may be narrowed, and therefore not completely random, based on information provided to the object detector 208.

The object detector 208 may also include a scanner scaler 236, which may be used to draw or select a window of a certain size. The window size may be used by the scanner locator 230 to narrow the sizes of windows when detecting an object or comparing a selection of windows to an original image to detect whether an image is within a specific window. The scanner scaler 236 may select one or more windows of certain sizes or scale levels initially when defining an object or, alternatively, draw one or more windows of certain sizes or scale levels based on information provided from the memory buffer 210.

The classifier 238 may be used to determine whether some or all of a target object is found in a specific window. In some configurations, the classifier 238 may produce a binary value for each window to indicate whether a target object is detected within a specific window or subwindow. This classification (e.g., binary classification) may be performed for each window searched by the object detector 208. Specifically, the classifier 238 may generate a binary 1 for each window in which the object is detected and a binary 0 for each window in which the object is not detected. Based on the number or a combination of 1s and 0s, the object detector 208 may determine a detection confidence value 240 indicating a likelihood that the target object is present within a current video frame (N) 224. In some configurations, the detection confidence value 240 is a real number between 0 and 1 indicating a percentage or probability that an object has been accurately detected.

The object detector 208 may perform object detection according to a variety of tracked parameters, including a region, target size, window size, scale level, window location and one or more confidence values. Once the windows of a video frame or a subset of windows are searched and the object detector 208 obtains a binary value for each searched window, the object detector 208 may determine window size as well as a location or region on the current video frame that has the highest confidence. This location and window size may be used in subsequent tracking and detecting to more accurately track and/or detect a target object.

As stated above, various methods may be used by the object detector 208 in detecting a target object. In one configuration, detecting a target object may include performing a binary classification for windows at every possible window location and every possible window size. However, searching every possible window is resource intensive. Thus, in another configuration, the object detector may search a subset of window locations and sizes, rather than all possible windows in a video frame. For example, the object detector 208 may search 1% of all possible windows. Then, if detection is unsuccessful (e.g., the detection confidence value 240 is less than a detection threshold 252), a higher percentage of window locations may be searched in a subsequent captured frame, e.g., 2%. The step in percentage of window locations searched may be uniform, non-uniform, slow or fast, i.e., consecutive frames may have 1%, 2%, 3%, 4% or 1%, 2%, 4%, 8%. In one configuration, the percentage of searched frames may be set very high (e.g., 80%, 90%, 100%) in response to a high detection confidence value, i.e., to ensure that the target object is a next video frame. For example, the percentage of searched frames may jump to at least 80% in response to a detection and tracking confidence value that exceeds a detection and tracking threshold value 256. Alternatively, the percentage may jump to 60%, 70%, 90%, etc. Additionally, any suitable value for the detection and tracking threshold value may be used, e.g., 0.6, 0.65, 0.7, 0.75, 0.8, 0.85, etc. Furthermore, the percentage of windows searched may be determined randomly, based on a randomizer 234 (random number generator), e.g., a random percentage of windows between 1% and 15% may be searched in a captured frame. By searching a subset of all the window locations, the object detection may use fewer resources in the electronic device 102.

Furthermore, the present systems and methods may search a subset of window sizes for each location. Each window size may be referred to herein as a scale level, each scale level corresponding to a specific window size. For example, there may be 20 possible scale levels. Rather than searching all 20 scale levels, a subset of scale levels or window sizes may be searched at each window location.

The present systems and methods may also use feedback from the memory buffer 210 to tailor the window locations and sizes searched. In other words, the location and size of the last captured video frame in which the target object was successfully detected and/or tracked may be used as a starting point for searching a current video frame (N) 224. For example, if the target object was detected and tracked in a recent video frame (i.e., the detection and tracking confidence value 256 for a recent captured video frame is above a detection and tracking threshold), the scanner locator may start searching a current captured frame at the location and size associated with the recent frame. For example, where a target object moves out of the field of view of an optical system or disappears at a distance, the target object may be more likely to reappear at the same size as when the target object left the field of view of the optical system or disappeared at a distance. Thus, a size or range of sizes may be predicted for detecting the target object in subsequent video frames when performing object detection.

Furthermore, the search range of window locations and window sizes searched in the captured video frame (N) 224 may be limited to those similar to the window location and window size associated with the target object in a recent video frame (e.g., the previous video frame (N−1) 222). As used herein, the term "search range" refers to the set of candidate window locations or candidate window sizes (or both) that may be utilized when detecting and/or tracking a target object in a video frame. For example, the subset of the window locations searched may be selected from within a portion of the current video frame (N) 224 based on where the target object was found in a recent video frame, e.g., one of the quadrants or halves of the current video frame (N) 224. In other words, the search space may be limited to nearby where the target object was last tracked or detected. Similarly, the sizes of frames searched for each window location may be limited based on the size of the window in which the targeted object was found in a recent video frame. For example, if the object was detected in a recent frame using a window with a scale level of 8, the scanner scaler 236 may select only window scale levels for the current video frame (N) 224 of 8, plus or minus 3, i.e., scale levels 5-11. This may further eliminate low probability searching and increase the efficiency of object detection. Alternatively, if a recent (non-current) video frame did not detect the target object (i.e., the detection and tracking confidence value 256 for the recent video frame is below a detection and tracking threshold), the object detector 208 may expand the search space (window locations) that is searched, e.g., a wider range of an image or the whole image may be subject to search.

The object tracking and detection module 204 may include a fusion module 260 to merge multiple windows to form a single window. There are initially two confidence values: a detection confidence value 240 from the object detector 208 and a tracking confidence value 225 from the motion tracker 206. The fusion module 260 may combine the two confidence values (e.g., pick the one that is larger) into a detection and tracking confidence value 256. The detection and tracking confidence value 256 may indicate whether the target object was identified on a video frame. In one configuration, the detection and tracking confidence value 256 may be a real number between 0 and 1, where 0 indicates the lowest possible confidence that the target object was identified in a particular video frame and 1 indicates the highest possible confidence that the target object was identified in a particular video frame. In other words, the detection and tracking confidence value 256 may serve as an overall indication of the likelihood that a target object was found. Further, the detection and tracking confidence value 256 may be a parameter used for determining a window location, window size or percentage of windows to search in a next video frame. The fusion module 260 may be used to provide information about a current video frame (N) 224 to the memory buffer 210. In one example, the fusion module 260 may provide information about the tracked window 242 (e.g., window location 244, window size 246, etc.) and a detection and tracking confidence value 256 to the memory buffer 210. The fusion module 260 may use the tracking results (e.g., bounding boxes) from the motion tracker 206 and object detector 208 to form a combined tracking result (e.g., bounding box) and calculate the detection and tracking confidence value 256.

The memory buffer 210 may store one or more values associated with the previous video frame (N−1) 222, the current video frame (N) 224 or other captured video frames. In one configuration, the memory buffer 210 stores a captured previous video frame 212, which may include information corresponding to the previous video frame (N−1) 222. The captured previous video frame 212 may include information about one or more windows 242, including the location 244, window size 246 and a binary decision 248 (e.g., from the classifier 238) for each window 242. The captured previous video frame 212 may also include a tracking threshold 250, detection threshold 252 and a detection and tracking threshold 254. The tracking threshold 250 may be provided to the motion tracker 206 or circuitry on the object tracking and detection module 204 (e.g., confidence level comparator) to determine 258 whether the tracking confidence level is greater than the tracking threshold 250. The detection threshold 252 may be provided to the object detector 208 or other circuitry on the object tracking and detection module 204 to determine whether the detection confidence value 240 is greater than the detection threshold 252. The detection and tracking threshold 254 may be a combined value based on the tracking threshold 250 and the detection threshold 252. The detection and tracking threshold 254 may be compared to a detection and tracking confidence value 256 to determine a combined confidence value for the motion-based tracking and the object detection. Each of the thresholds may be based on a likelihood that a target object is located within a video frame. The object tracking and detection module 204 may perform motion-based tracking and/or detection on a current video frame (N) 224 until a specific detection and tracking confidence value 256 is obtained. Further, the motion-based tracking and object detection may be performed on each video frame in a sequence of multiple video frames.

Performing motion-based tracking and object detection may include sequentially performing motion-based tracking followed by object detection based on a tracked parameter. In particular, the present systems and methods may implement a two-step tracking and detection approach. Since motion-based tracking is based on the relative motion of a scene, rather than actual object identification as used object detection, the motion-based tracking may be less resource-intensive in an electronic device than performing object detection. Accordingly, it may be more efficient to use the motion tracker 206 instead of the object detector 208, where a target object may be accurately tracked without also performing object detection.

Therefore, rather than using the motion tracker 206 in parallel with the object detector 208, the object tracking and detection module 204 only uses the object detector 208 where the motion tracker 206 is insufficient, i.e., the motion tracking and object detection (if performed at all) are performed sequentially instead of in parallel. For each video frame on which tracking is performed, the motion tracker 206 may produce a tracking confidence value 228, which may be a real number between 0 and 1 indicating a likelihood that the target object is in a current video frame (N) 224.

In one configuration of the two-step tracking and detection approach, the motion tracker 206 may first perform motion-based tracking on a current video frame (N) 224. The motion tracker 206 may determine a tracking confidence value 228 based on the motion-based tracking process. Using the tracking confidence value 228 and a tracking threshold 250 provided by the memory buffer 210, circuitry within the object tracking and detection module 204 (e.g., a confidence level comparator) may determine 258 whether the tracking confidence value 228 exceeds a tracking threshold 250. If the tracking confidence value 228 is greater than the tracking threshold 250, the object tracking and detection module 204 may skip performing object detection and provide the tracking result to a fusion module 260 to produce an output 262. The output 262 may include an indication that a target object is within a current video frame (N) 224. Further, the output 262 may include additional information about the target object.

If the tracking confidence value 228 does not exceed the tracking threshold 250, the object detector 208 may subsequently perform object detection on the current video frame (N) 224. The object detection may be performed on all or a subset of windows within the current video frame (N) 224. The object detector 208 may also select a subset of windows, window sizes or other detection criteria based on results of the motion-based tracking and/or information provided from the memory buffer 210. The object detection may be performed using a more or less robust process based on one or more tracked parameters provided to the object detector 208. The object detector 208 may determine a detection confidence value 240 and compare the detection confidence value 240 to a detection threshold 252. If the detection confidence value 240 is above a detection threshold 252, the object detector 208 may provide the detection result to the fusion module 260 to produce an output 262. The output 262 may include an indication that a target object is within a current video frame (N) 224 and/or include additional information about the detected object.

Alternatively, if the detection confidence value 240 is less than or equal to a detection threshold 252, the object detector 208 may perform object detection again using a more robust method, such as searching a greater number of windows within the current video frame (N) 224. The object detector 208 may repeat the process of object detection until a satisfactory detection confidence value 240 is obtained. Once a satisfactory detection confidence value 240 is obtained such that a target object within the current video frame is identified, the object tracking and detection module 204 may be used to perform tracking and detection on a next video frame.

Figure 2B:
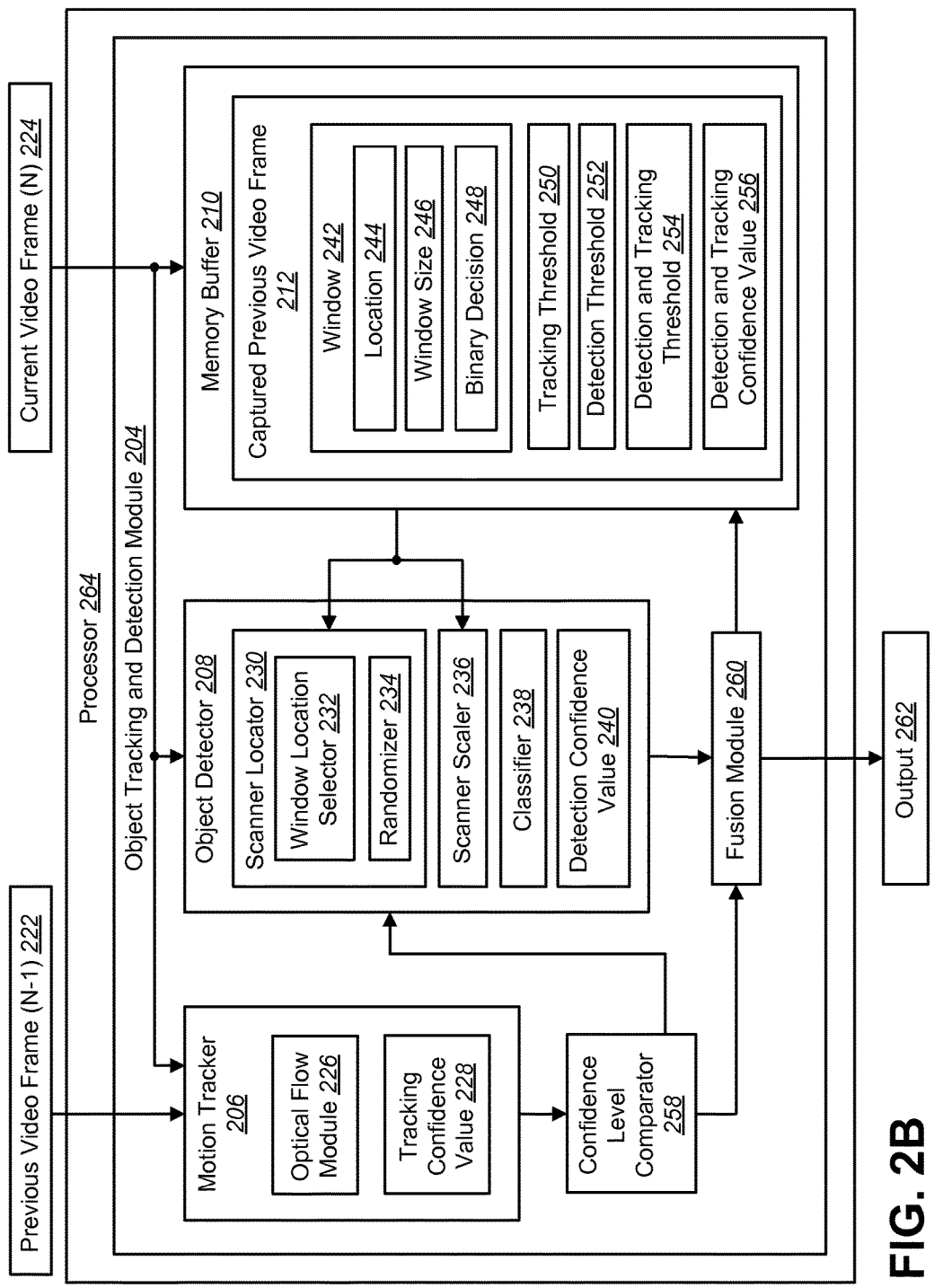
FIG. 2B illustrates some components within the system of FIG. 2A being implemented by a processor.

FIG. 2B illustrates some components within the system of FIG. 2A being implemented by a processor 264. As shown in FIG. 2A, the object tracking and detection module 204 may be implemented by a processor 264. Different processors may be used to implement different components (e.g., one processor may implement the motion tracker 206, another processor may be used to implement the object detector 208 and yet another processor may be used to implement the memory buffer 210).

Figure 3:
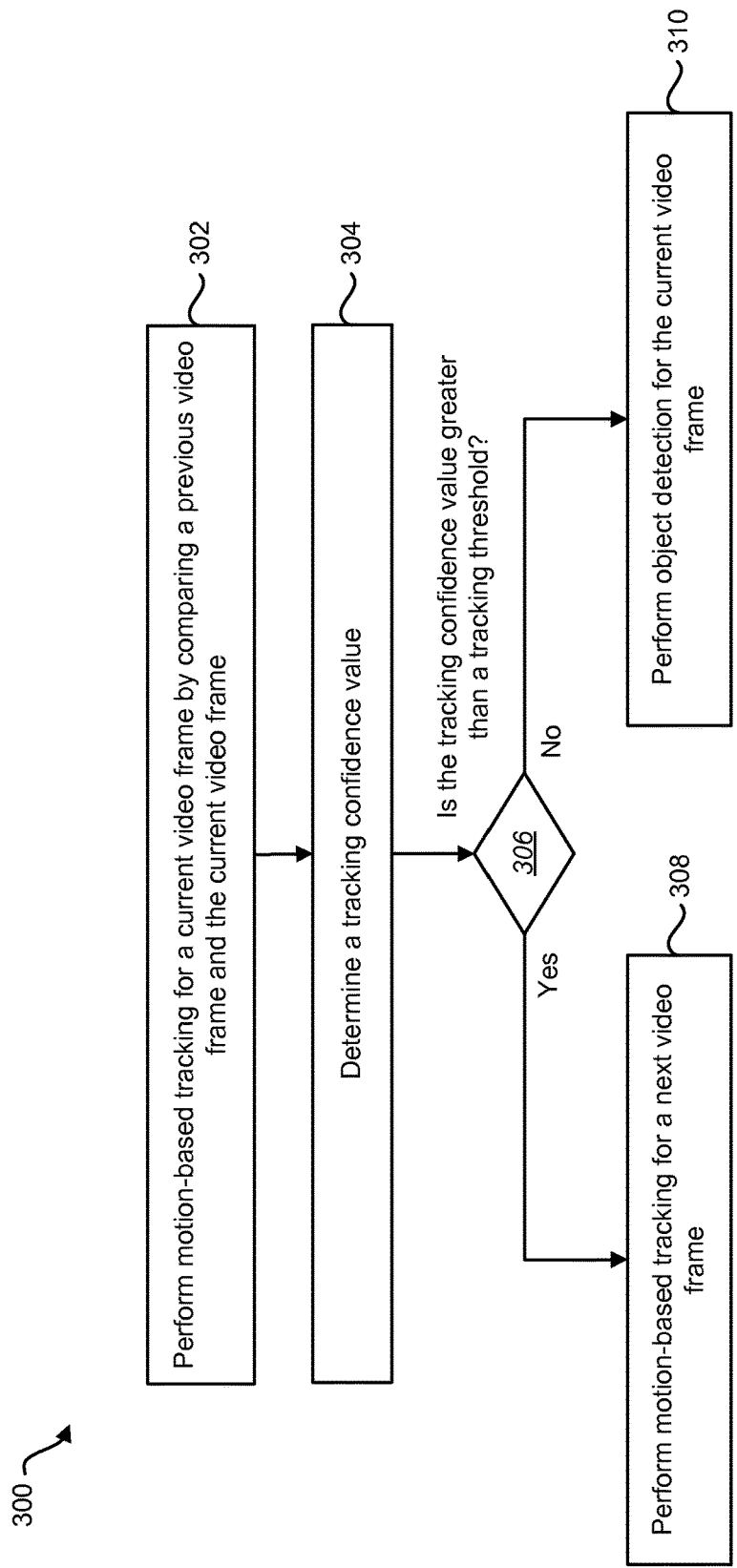
FIG. 3 is a flow diagram illustrating a method for performing motion-based tracking and object detection.

FIG. 3 is a flow diagram illustrating a method 300 for performing motion-based tracking and object detection. The method 300 may be implemented by an electronic device 102, e.g., an object tracking and detection module 104. The electronic device 102 may perform 302 motion-based tracking for a current video frame (N) 224 by comparing a previous video frame (N−1) 222 and the current video frame (N) 224. Tracking an object may be performed using a median flow method by tracking points between pairs of images. Other methods of motion-based tracking may also be used. Additionally, the motion-based tracking may be performed for a current video frame (N) 224 using information about a captured previous video frame 112 provided via a memory buffer 110.

The electronic device 102 may determine 304 a tracking confidence value 228. The tracking confidence value 228 may indicate a likelihood or certainty that a target object has been accurately tracked. The electronic device 102 may determine 306 whether the tracking confidence value 228 is greater than a tracking threshold 250. If the tracking confidence value 228 is greater than the tracking threshold 250, the electronic device 102 may perform 308 motion-based tracking for a next video frame. Further, the electronic device 102 may skip performing object detection on the current video frame (N) 224 based on the result of the motion-based tracking. In other words, object detection may be performed for the current video frame (N) 224 only when the motion tracking is not very good, i.e., if the tracking confidence value 228 is not greater than a tracking threshold 250. If, however, the tracking confidence value 228 is not greater than the tracking threshold 250, the electronic device 102 may perform 310 object detection for the current video frame (N) 224. The electronic device 102 may perform the object detection in sequence to the motion-based tracking. In some configurations, the object detection may be performed multiple times with varying robustness to obtain a higher detection confidence value 240.

Figure 4:
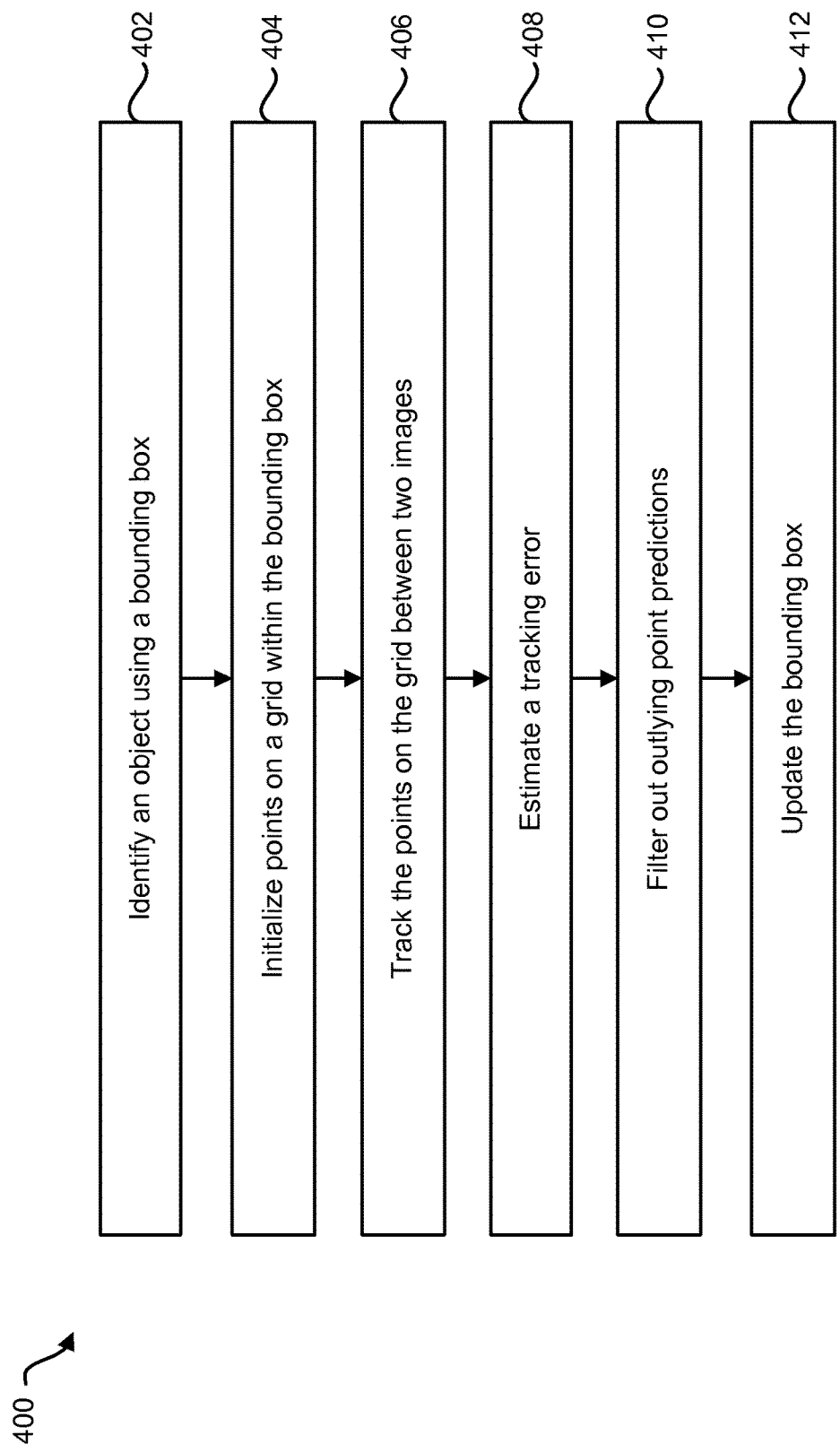
FIG. 4 is a flow diagram illustrating a method for performing motion-based tracking.

FIG. 4 is a flow diagram illustrating a method 400 for performing motion-based tracking. The method 400 may be implemented by an electronic device 102, e.g., an object tracking and detection module 104. The electronic device 102 may identify 402 a target object using a bounding box. Identifying 402 an object may be performed manually using a touchscreen 116 or other input method in which an object of interest is selected. Multiple objects may be identified in a similar way. Further, other input methods may be used to identify an object to be tracked. In one example, an object is identified by manually drawing a bounding box around the target object.

The electronic device 102 may initialize 404 points on a grid within the bounding box. The points on the grid may be uniformly spaced throughout the bounding box. Further, the points may be tracked 406 on the grid between two images (e.g., previous video frame (N−1) 222 and current video frame (N) 224). In one example, the points are tracked by a Lucas-Kanade tracker that generates a sparse motion flow between images. The electronic device 102 may estimate 408 a tracking error between the two images (e.g., a previous video frame (N−1) 222 and a current video frame (N) 224). Estimating 408 a tracking error may include assigning each point of the tracked points an error value. Further, estimating 408 a tracking error may be performed using a variety of methods, including forward-backward error, normalized cross correlation (NCC) and sum-of-square differences, for example. The estimated tracking error may be used to obtain a tracking confidence value 228 and ultimately determining a likelihood that a target object is in a current video frame (N) 224. In one configuration, the tracking confidence value 228 may be obtained by calculating a normalized cross correlation (NCC) between a tracked window in a current video frame (N) 224 and a previous video frame (N−1) 222. The tracking error may also be estimated using additional techniques, including a forward-backward error estimation described in more detail below in connection with FIG. 5. Further, the electronic device 102 may filter 410 out outlying point predictions. For example, the electronic device may filter out 50% of the worst predictions. The remaining predictions may be used to estimate the displacement of the bounding box.

The electronic device 102 may update 412 the bounding box. Updating 412 the bounding box may be performed such that the updated bounding box becomes the new bounding box for the next video frame. The motion-based tracking process may then be repeated for a next video frame or, if a tracking confidence value 228 is less than or equal to a tracking threshold 250, the motion-based tracking process may be discontinued for a next video frame until a target object may be accurately tracked. In some configurations, where the motion-based tracking for a current video frame (N) 224 does not provide a satisfactory result, the electronic device 102 may perform object detection on the current video frame (N) 224 to obtain a higher level of confidence in locating a target object. In some configurations, where motion-based tracking cannot produce satisfactory results (e.g., when a target object moves out of range of a video frame), object detection may be performed on any subsequent video frames until a target object is detected.

Figure 5:
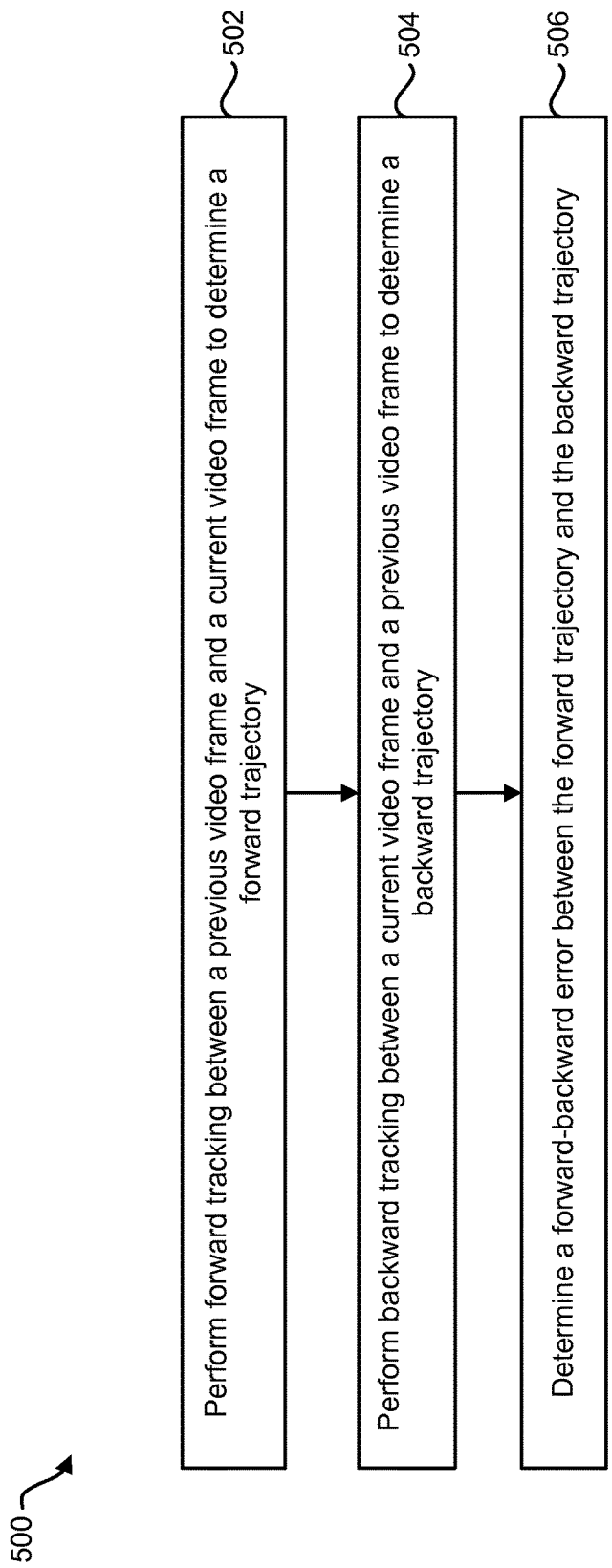
FIG. 5 is a flow diagram illustrating a method for estimating a tracking error in motion-based tracking based on forward-backward error.

FIG. 5 is a flow diagram illustrating a method 500 for estimating a tracking error in motion-based tracking based on forward-backward error. The method 500 may be implemented by an electronic device 102 (e.g., an object tracking and detection module 104). In some configurations, the electronic device 102 may calculate a normalized cross correlation (NCC) between tracked windows. The normalized cross correlation (NCC) may be used to determine a tracking confidence value 228. The electronic device 102 may also use various tracking error estimation techniques complementary to normalized cross correlation (NCC) (e.g., forward-backward error, sum-of-square difference). In an example using forward-backward error estimation, an electronic device 102 may perform 502 forward tracking between a previous video frame (N−1) 222 and a current video frame (N) 224 to determine a forward trajectory. Forward tracking may include tracking an image forward for k steps. The resulting forward trajectory may be equal to ($x_t$, $x_{t+1}$, . . . , $x_{t+k}$), where $x_t$ is a point location in time and k indicates a length of a sequence of images. The electronic device 102 may perform 504 backward tracking between a current video frame (N) 224 and a previous video frame (N−1) 222 to determine a backward trajectory. The resulting backward trajectory may be equal to ($\hat{x}_t$, $\hat{x}_{t+1}$, . . . , $\hat{x}_{t+k}$), where $\hat{x}_{t+k} = x_{t+k}$.

The electronic device 102 may determine 506 a forward-backward error between the forward trajectory and the backward trajectory. The forward-backward error may be defined as the distance between the forward trajectory and the backward trajectory. Further, various distances may be defined for the trajectory comparison. In one configuration, the Euclidean distance between the initial point and the end point of the validation trajectory may be used when determining the forward-backward error. In one configuration, the forward-backward error may be used as the tracking error, which may be used to determine a tracking confidence value 228.

Figure 6:
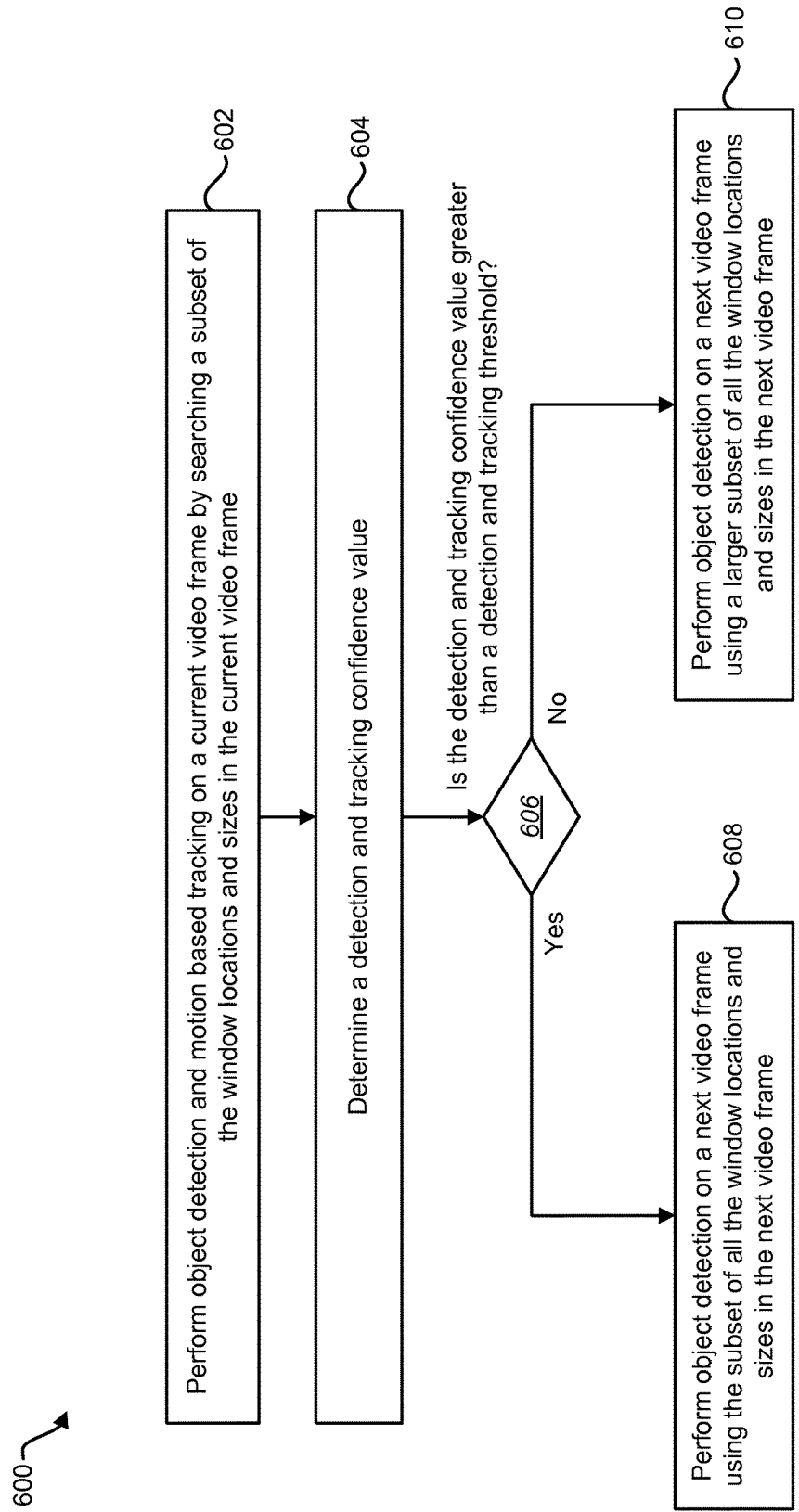
FIG. 6 is a flow diagram illustrating a method for performing object detection.

FIG. 6 is a flow diagram illustrating a method 600 for performing object detection. The method 600 may be implemented by an electronic device 102 (e.g., an object tracking and detection module 104). The electronic device 102 may perform 602 object detection and motion-based tracking on a current video frame (N) 224 by searching a subset of the window locations and sizes in the current video frame (N) 224.

The electronic device 102 may determine 604 a detection and tracking confidence value 256. The detection and tracking confidence value 256 may provide a level of confidence of whether the target object is found in a current video frame (N) 224 or within a particular window. The electronic device 102 may also determine 606 whether the detection and confidence value 256 is greater than a detection and tracking threshold 254. If the detection and confidence value 256 is greater than a detection and tracking threshold 254, the electronic device 102 may perform 608 object detection on a next video frame using the subset (e.g., the same subset) of windows and sizes in the next video frame. Alternatively, if the detection and confidence value 256 is less than a detection and tracking threshold 254, the electronic device 102 may perform 610 object detection on a next video frame using a larger subset of the window locations and sizes in the next video frame. In some configurations, where the confidence value 256 is less than a detection and tracking threshold 254, the electronic device 102 may perform 610 object detection on a next video frame using the entire search space and/or all windows of the next video frame.

Figure 7:
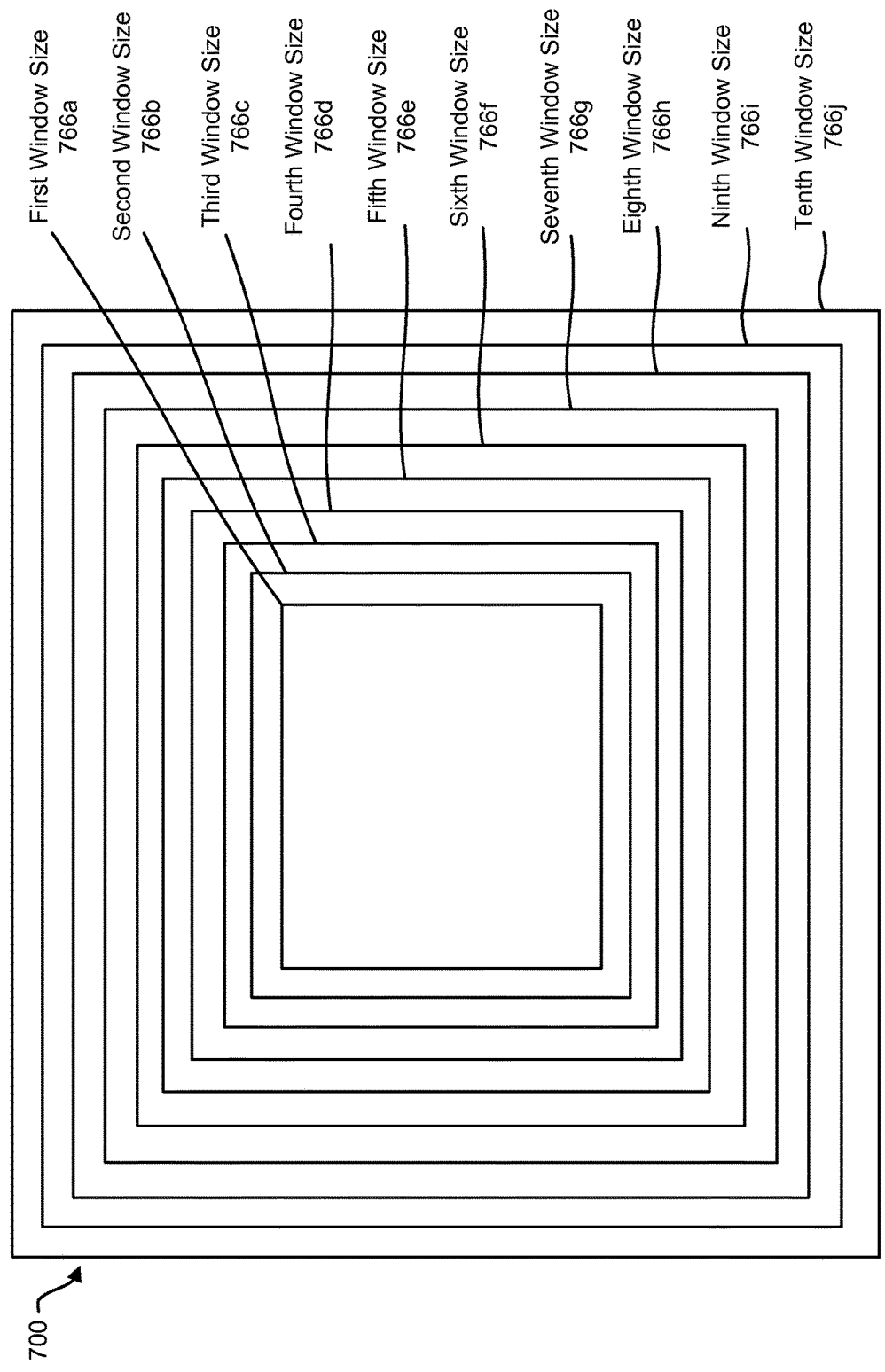
FIG. 7 is a block diagram illustrating different window sizes that may be used with the present systems and methods.

FIG. 7 is a block diagram illustrating an image window 700 having different window sizes 766 that may be used with the present systems and methods. Specifically, FIG. 7 illustrates a set of ten possible window sizes 766*a-j*. Each window size 766 may correspond to a scale level (e.g., 1-10). Although shown herein as rectangular, the windows that are searched may be any shape, e.g., square, rectangular, circular, elliptical, user-defined, etc. Furthermore, any number of window sizes 766 or scale levels may be available, e.g., 5, 15, 20, 30, etc.

As described above, the search range may be denoted by a subset of window sizes used for a particular location, e.g., the window sizes that are searched in the current video frame (N) 224 may be limited to those similar to the window location and window size associated with the target object in the recent frame. For example, without feedback, the object detector 208 may search all ten window sizes 766*a-j* for each selected window location. However, if the object was detected in a recent (non-current) video frame using a window with the fifth window size 766*e*, the scanner scaler 236 may select only window sizes for the current captured frame of 5, plus or minus 3, i.e., window sizes 2-8. In other words, the windows with the first window size 766*a*, ninth window size 766*i* and tenth window size 766*j* may not be searched based on feedback from a recent or previous video frame (N−1) 222. This may further eliminate low probability searching and increase the efficiency of object detection. In other words, using feedback from a recent video frame may help reduce computations performed. Alternatively, if a recent video frame did not detect the target object (i.e., the detection and tracking confidence value 256 for the recent captured frame is less than a detection and tracking threshold 254), the object detector 208 may not limit the search range by using a subset of size levels.

Figure 8:
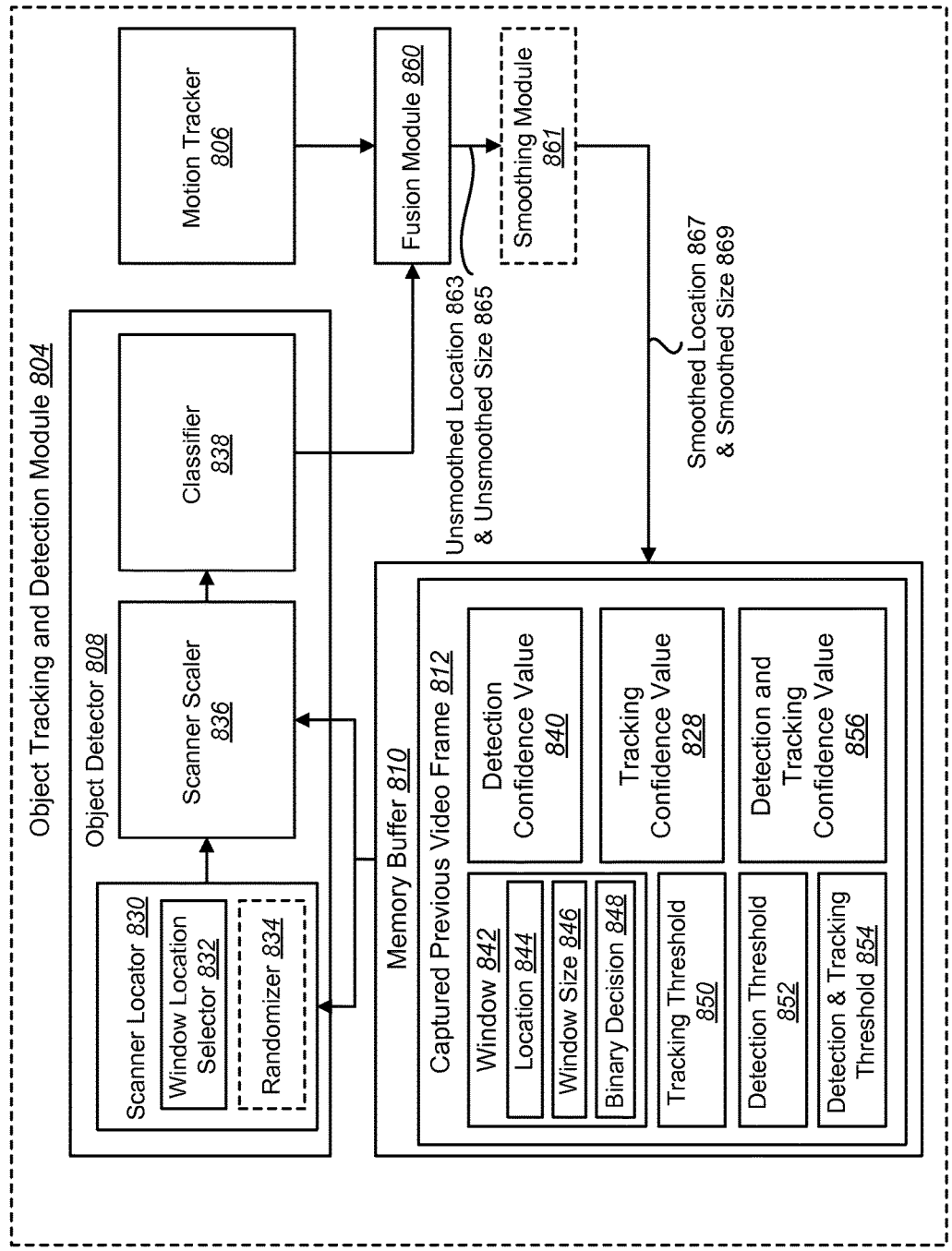
FIG. 8 is a block diagram illustrating another possible configuration of an object tracking and detection module.

FIG. 8 is a block diagram illustrating another possible configuration of an object tracking and detection module 804. The object tracking and detection module 804 illustrated in FIG. 8 may include similar modules and perform similar functionality to the object tracking and detection module 204 illustrated in FIG. 2. Specifically, the object detector 808, motion tracker 806, scanner locator 830, window location selector 832, randomizer 834, scanner scaler 836, classifier 838, fusion module 860, memory buffer 810, captured previous video frame 812, window 842, location 844, size 846, binary decision 848, tracking threshold 850, detection threshold 852, detection and tracking threshold 854, detection confidence value 840, tracking confidence value 828 and detection and tracking confidence value 856 illustrated in FIG. 8 may correspond and have similar functionality to the object detector 208, motion tracker 206, scanner locator 230, window location selector 232, randomizer 234, scanner scaler 236, classifier 238, fusion module 260, memory buffer 210, captured previous video frame 212, window 242, location 244, size 246, binary decision 248, tracking threshold 250, detection threshold 252, detection and tracking threshold 254, detection confidence value 240, tracking confidence value 228 and detection and tracking confidence value 256 illustrated in FIG. 2.

In addition, the object tracking and detection module 804 may include a smoothing module 861 that is used to reduce the jittering effect due to target motion and tracking error. In other words, the smoothing module 861 smooth the tracking results, causing a search window to have a smoother trajectory in both location (x, y) 844 and size (width, height) 846. The smoothing module 861 can be simple moving average (MA) filters or auto regression (AR) filters. The smoothing degree for the location 844 and size 846 can be different. Predictive filters, such as a Kalman filter may also be suitable for location 844 smoothing. Therefore, the smoothing module 861 may receive an unsmoothed location 863 and an unsmoothed size 865 as input and output a smoothed location 867 and a smoothed size 869.

Figure 9:
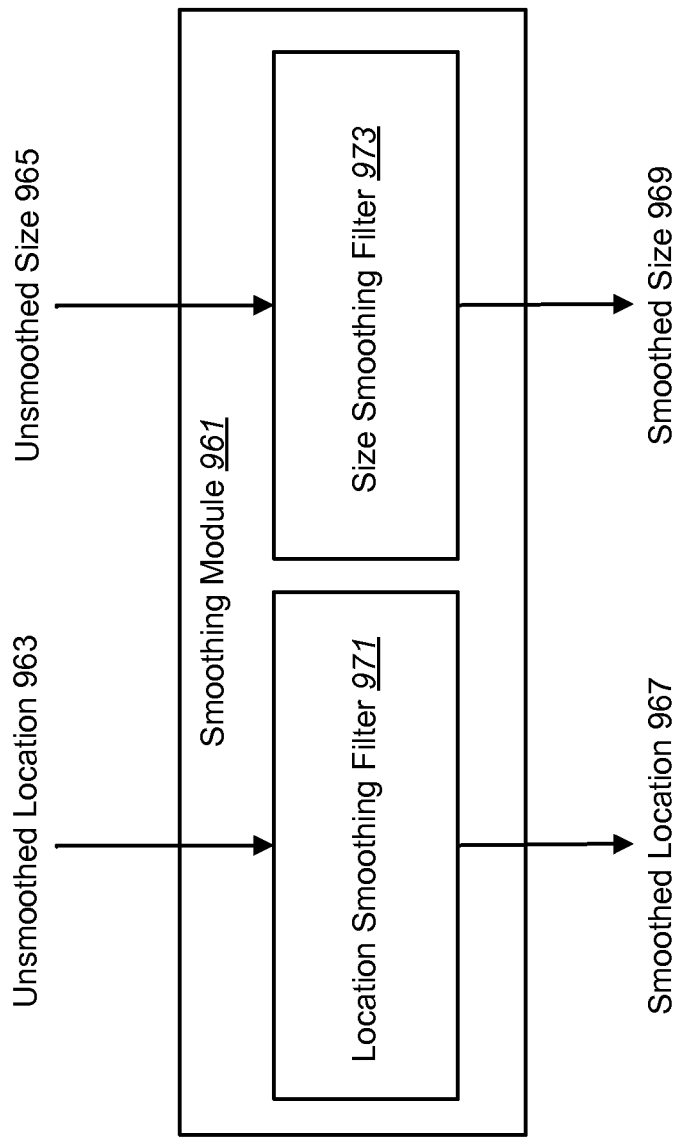
FIG. 9 is a block diagram illustrating a smoothing module.

FIG. 9 is a block diagram illustrating a smoothing module 961. The smoothing module 961 may be used to reduce the jittering effect due to target motion and tracking error, i.e., so the tracking results (bounding box) have a smoother trajectory in both location(x, y) and size(width, height). In one configuration, the location smoothing filter 971 and the size smoothing filter 973 are implemented using an auto regression (AR) model to receive an unsmoothed location 963 and an unsmoothed size 965 as input and output a smoothed location 967 and a smoothed size 969.

In an auto regression (AR) model, assume X is the variable to be smoothed, either the location or the size. Furthermore, let X' be the output of X by the object tracker. In this configuration, the smoothed filtering of X at time t, $X_t$, can be described according to Equation (1):

$$X_t = W*X'_t + (1-W)*X_{t-1} \quad (1)$$

where $X'_t$ is the tracker output of X at time t, $X_{t-1}$ is the smoothed result of X at time t−1, and W (0<=W<=1) is a smoothing weight that controls the smoothing effect. For example, $X'_t$ may be a window location or window size selected for a current video frame (N) 224 and $X_{t-1}$ may be a window location or window size used for a previous video frame (N−1) 222.

A different smoothing weight, W, can be used for the location smoothing filter 971 and the size smoothing filter 973. For example, in one implementation, $W_{location}$=0.8 and $W_{size}$=0.4 so that there is less smoothing effect on the window location but stronger smoothing effect on the window size. This selection of smoothing weights will produce both less tracking delay and less jittering.

Furthermore, the selection of smoothing weight may also be reduced when the detection and tracking confidence value 856 falls below a certain threshold (e.g., the detection and tracking threshold 854). This may cause stronger filtering when potential tracking or detection errors are high. For example, in response to low tracking confidence (e.g., the detection and tracking confidence value 856 is below the detection and tracking threshold 854), the smoothing weights for location and size may be set to $W_{location}$=0.65 and $W_{size}$=0.2, respectively. In other words, one or both of the weights may be decreased, which may cause the window location and size selection to lean more heavily on window locations and sizes of previous video frames than those of a current video frame.

Furthermore, the weighting may be based on a tracking confidence value 828 or a detection confidence value 840 rather than a detection and tracking confidence value 856. For example, the smoothing weights, $W_{location}$ and $W_{size}$, may be decreased in response to a tracking confidence value 828 falling below a tracking threshold 850, i.e., stronger filtering may be used in response to poor motion tracking. Alternatively, the smoothing weights may be decreased in response to a detection confidence value 840 falling below a detection threshold 852, i.e., stronger filtering may be used in response to poor object detection.

In another configuration, Kalman filtering may be used to smooth the window location. In such a configuration, the filtering may be defined according to Equations (2)-(7):

$$x_k = F_k x_{k-1} + w_k \quad (2)$$

$$z_k = H x_{k-1} + v_k \quad (3)$$

where $x_{k-1}$ is the previous state at time k−1, $x_k$ is the current state defined by $x_k=[x, y, \dot{x}, \dot{y}]$, where (x,y) are the bounding box center location, ($\dot{x}, \dot{y}$) are the velocity in each direction. Furthermore, the state transition model, $F_k$, and the observation model, H, may defined by Equations (4)-(5), respectively:

$$F_k = \begin{bmatrix} 1, & 0, & \Delta t, & 0 \\ 0, & 1, & 0, & \Delta t \\ 0, & 0, & 1, & 0 \\ 0, & 0, & 0, & 1 \end{bmatrix} \quad (4)$$

$$H = \begin{bmatrix} 1, 0, 0, 0 \\ 0, 1, 0, 0 \end{bmatrix} \quad (5)$$

where $\Delta t$ is a tunable parameter. Additionally, wk is process noise that is assumed to be drawn from a zero mean multivariate normal distribution with covariance Q (i.e., $w_k \sim N(0, Q)$) according to Equation (6):

$$Q = \begin{bmatrix} 1, 0, 0, 0 \\ 0, 1, 0, 0 \\ 0, 0, 1, 0 \\ 0, 0, 0, 1 \end{bmatrix} * \sigma_1^2 \quad (6)$$

where $\sigma_1$ is a tunable parameter. Similarly, wk is observation noise that is assumed to be zero mean Gaussian white noise with covariance R (i.e., $v_k \sim N(0, R)$) according to Equation (7):

$$R = \begin{bmatrix} 1, 0, 0, 0 \\ 0, 1, 0, 0 \\ 0, 0, 1, 0 \\ 0, 0, 0, 1 \end{bmatrix} * \sigma_2^2 \quad (7)$$

where $\sigma_2$ is a tunable parameter.

Figure 10:
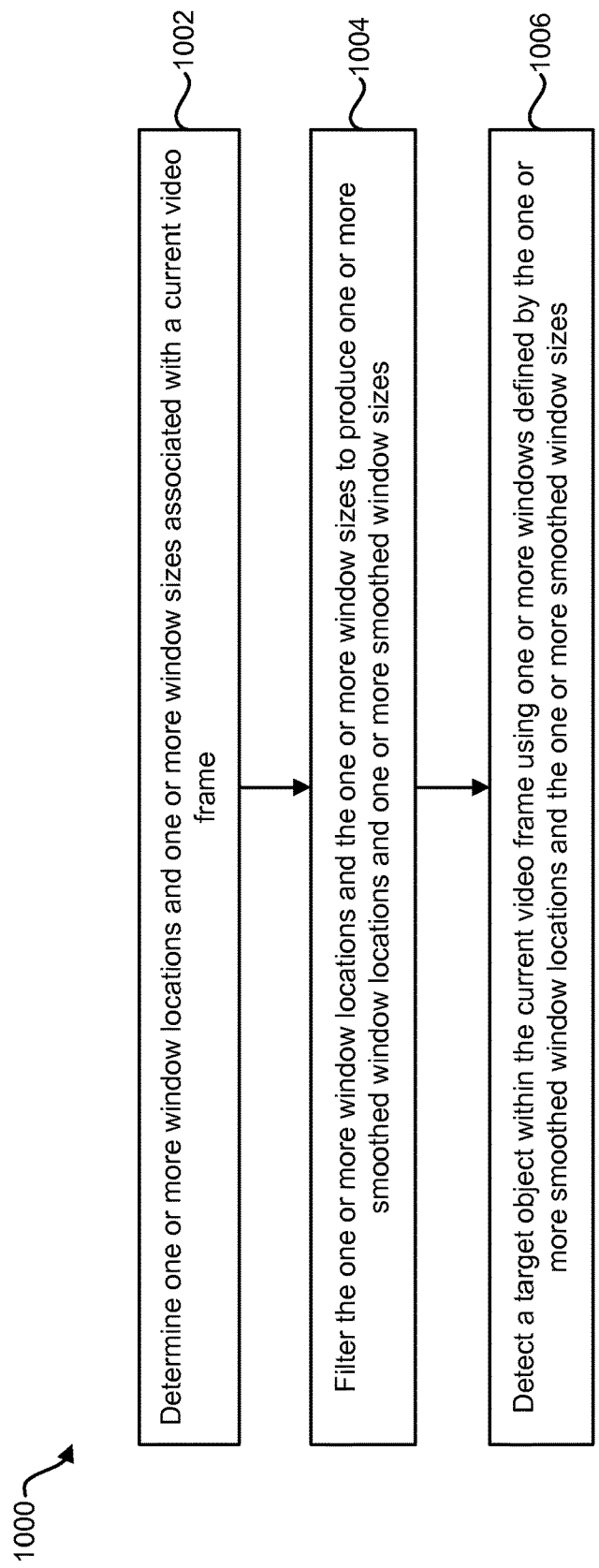
FIG. 10 is a flow diagram illustrating a method for smoothing jitter in motion tracking results.

FIG. 10 is a flow diagram illustrating a method 1000 for smoothing jitter in motion tracking results. The method 1000 may be performed by an electronic device 102, e.g., an object tracking and detection module 804 in an electronic device 102. The electronic device 102 may determine 1002 one or more window locations and one or more window sizes associated with a current video frame 224, e.g., an unsmoothed location 863 and unsmoothed size 865. The electronic device 102 may also filter 1004 the one or more window locations and the one or more window sizes to produce one or more smoothed window locations 867 and one or more smoothed window sizes 869. For example, this may include using a moving average filter, an auto regression filter or a Kalman filter. In one configuration, in response to low tracking confidence (e.g., the detection and tracking confidence value 856 is below the detection and tracking threshold 854), the smoothing weights for location and size may be reduced. Alternatively, the smoothing weights may be reduced based on the detection confidence value 840 or the tracking confidence value 828. The electronic device may also detect 1006 a target object within the current video frame 224 using one or more windows defined by the one or more smoothed window locations 867 and the one or more smoothed sizes 869.

Figure 11:
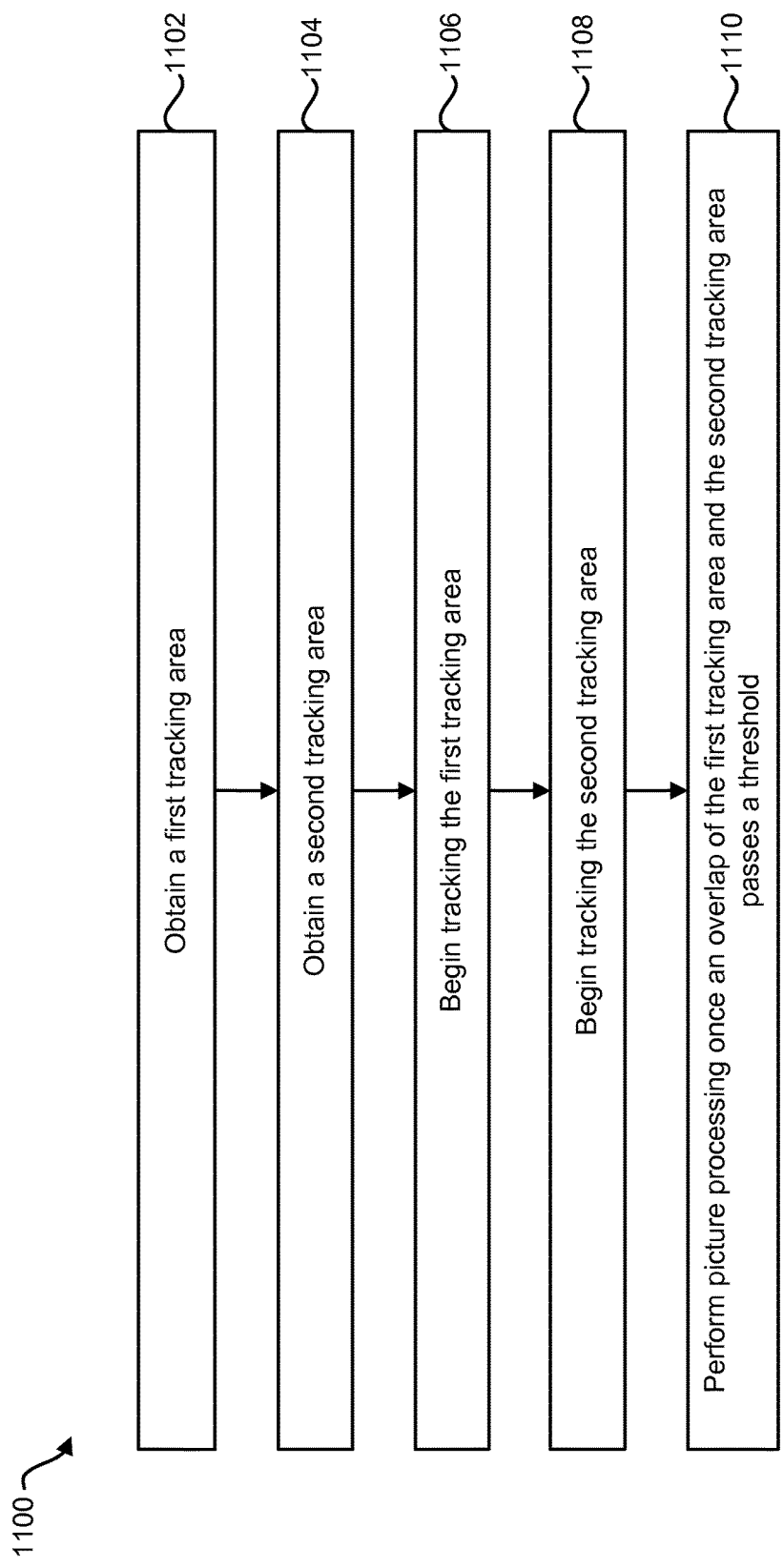
FIG. 11 is a flow diagram of a method for performing picture processing using object tracking.

FIG. 11 is a flow diagram of a method 1100 for performing picture processing using object tracking. The method 1100 may be performed by an electronic device 102. The electronic device 102 may obtain 1102 a first tracking area 133. The electronic device 102 may also obtain 1104 a second tracking area 135. In one configuration, each of the tracking areas may be obtained by the electronic device 102 using a touchscreen 116 or a viewfinder 131. As an example, the second tracking area 135 may cover the entire viewfinder 131.

An area within the touchscreen 116 (typically a square or circle, although other shapes may also be used) may be defined by the user. This area may be referred to as the tracking area or the focus ring. The focus ring may be a user interface (UI) element that allows a user of the electronic device 102 to quickly select an object or area for tracking. As an example, the user may place the focus ring over an area or object, thereby attaching the focus ring to the object. Once the user's finger is removed from the touchscreen, the focus ring may begin tracking the object.

The focus ring may change appearance depending on the state of the object tracking (e.g., object being tracked, object not being tracked, tracking but object has been lost). The focus ring may be resized or altered in shape (e.g., from a circle to an ellipse or to a square) to enable tracking of arbitrarily shaped objects. In one configuration, touching the focus ring on a tracked object may cause the electronic device 102 to stop tracking that object. The focus ring may follow the object around the touchscreen 116 or viewfinder 131.

The electronic device 102 may begin tracking 1106 the first tracking area 133. The electronic device 102 may also begin tracking 1108 the second tracking area 135. The electronic device 102 may perform picture processing 1110 once an overlap 143 of the first tracking area 133 and the second tracking area 135 passes a threshold 145. Depending on the configuration, the picture processing may occur when the overlap 143 goes above the threshold 145 or when the overlap 143 goes below the threshold 145. The picture processing may include taking a photograph and/or performing video editing (e.g., removing an object from a video frame).

Figure 12A:
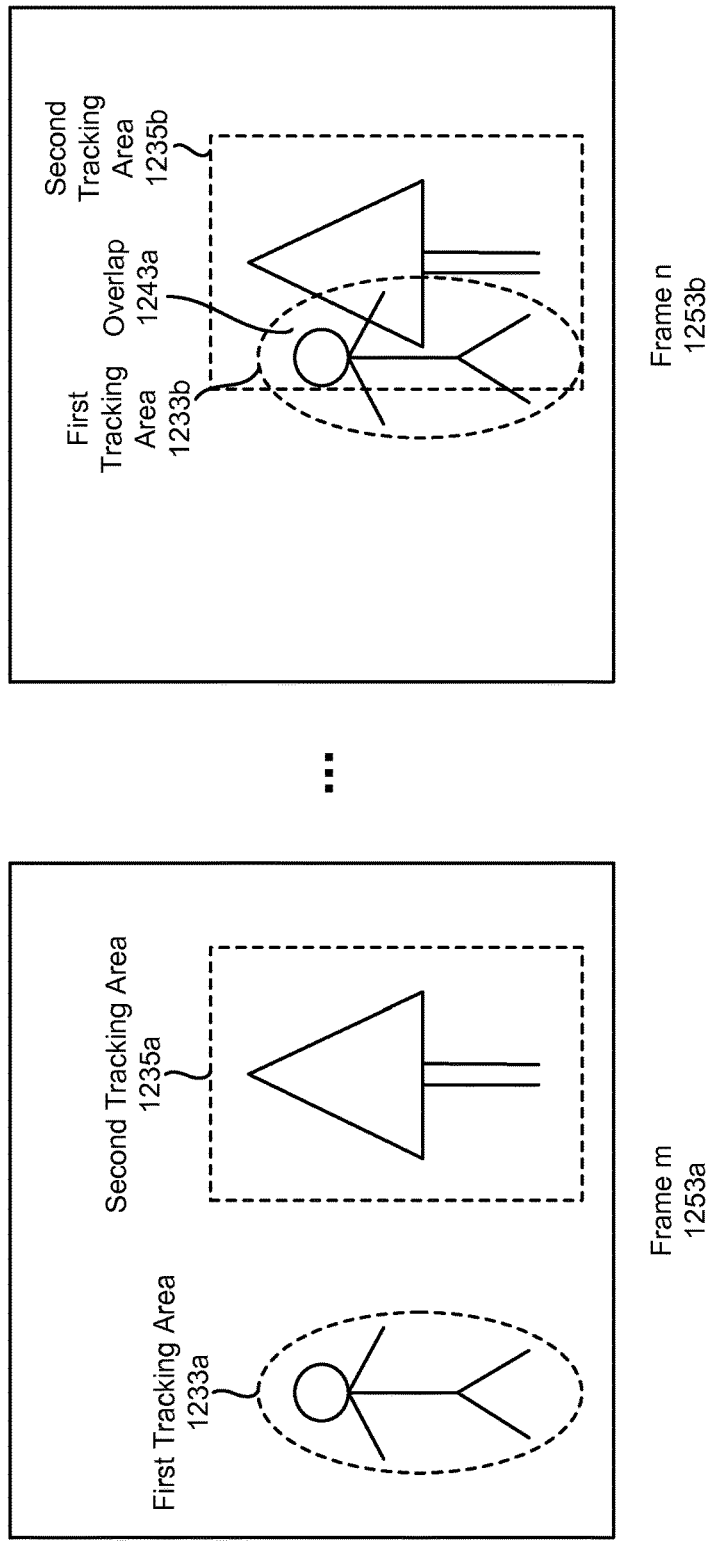
FIG. 12A illustrates one example of picture processing using object tracking.

FIG. 12A illustrates one example of picture processing using object tracking. Multiple frames 1253*a-b* are illustrated. The frames 1253 may be part of a prerecorded video sequence 147 or live frames viewed through a viewfinder 131. In frame m 1253*a*, a first tracking area 1233*a* is illustrated around a walking person and a second tracking area 1235*a* is illustrated around a stationary tree. A user may desire to take a photograph 149 once the walking person is in front of the stationary tree. In frame m 1253*a*, the first tracking area 1233*a* does not overlap the second tracking area 1235*a* (i.e., the overlap 143 is 0%). The electronic device 102 may be configured to perform picture processing once the overlap 143 reaches 50%. In this configuration, the electronic device 102 may be configured to take a photograph 149 once the overlap 143 reaches 50%.

In frame n 1253*b*, time has elapsed since frame m 1253*a*. The first tracking area 1233*b* has remained on the walking person and the second tracking area 1235*b* has remained on the stationary tree. Because the walking person has moved, the first tracking area 1233*b* is now overlapping 1243*a* the second tracking area 1235*b* by more than 50%. Thus, once the overlap 1243*a* reaches 50%, the electronic device 102 is configured to take a photograph 149 (in this case, a photograph 149 of the walking person in front of the stationary tree).

Figure 12B:
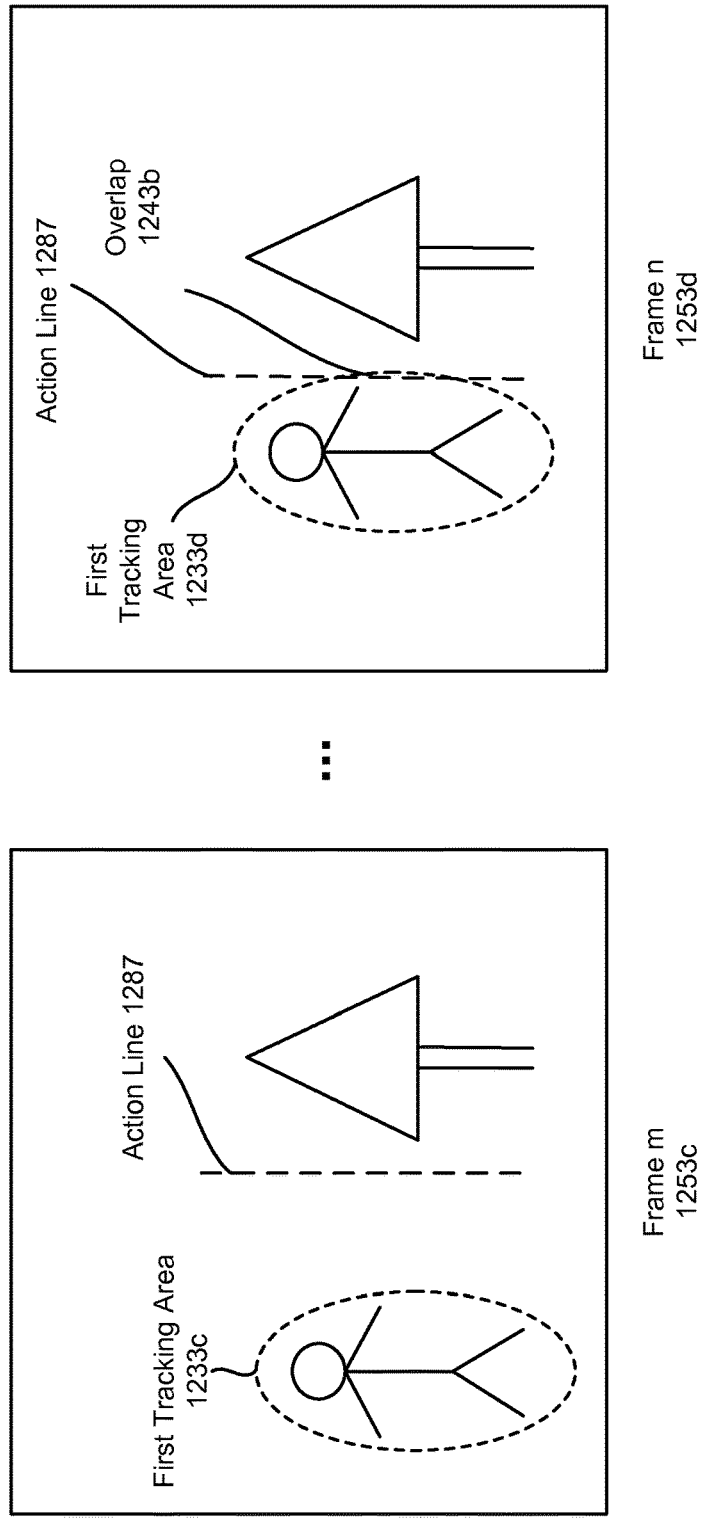
FIG. 12B also illustrates an example of picture processing using object tracking.

FIG. 12B also illustrates an example of picture processing using object tracking. Multiple frames 1253*c-d* are illustrated. The frames 1253 may be part of a prerecorded video sequence 147 or live frames viewed through a viewfinder 131. In frame m 1253*c*, a first tracking area 1233*c* is illustrated around a walking person and an action line 1287 is illustrated near a stationary tree. The action line 1287 may be a vertical line, a horizontal line, or other type of line (such as a curved line). Both the first tracking area 1233*c* and the action line 1287 may be set by a user. The user may desire to take a photograph (or burst of photographs) or perform other video processing once the walking person has crossed the action line 1287 (i.e., when an overlap 1243*b* occurs).

In frame n 1253*d*, time has elapsed since frame m 1253*c*. The first tracking area 1233*d* has remained on the walking person and the action line 1287 has remained near the stationary tree. Because the walking person has moved, the first tracking area 1233*d* is now overlapping 1243*b* the action line 1287. Once the first tracking area 1233*d* crosses the action line 1287, the electronic device 102 may be configured to take a photograph 149 or perform other picture processing.

Figure 13:
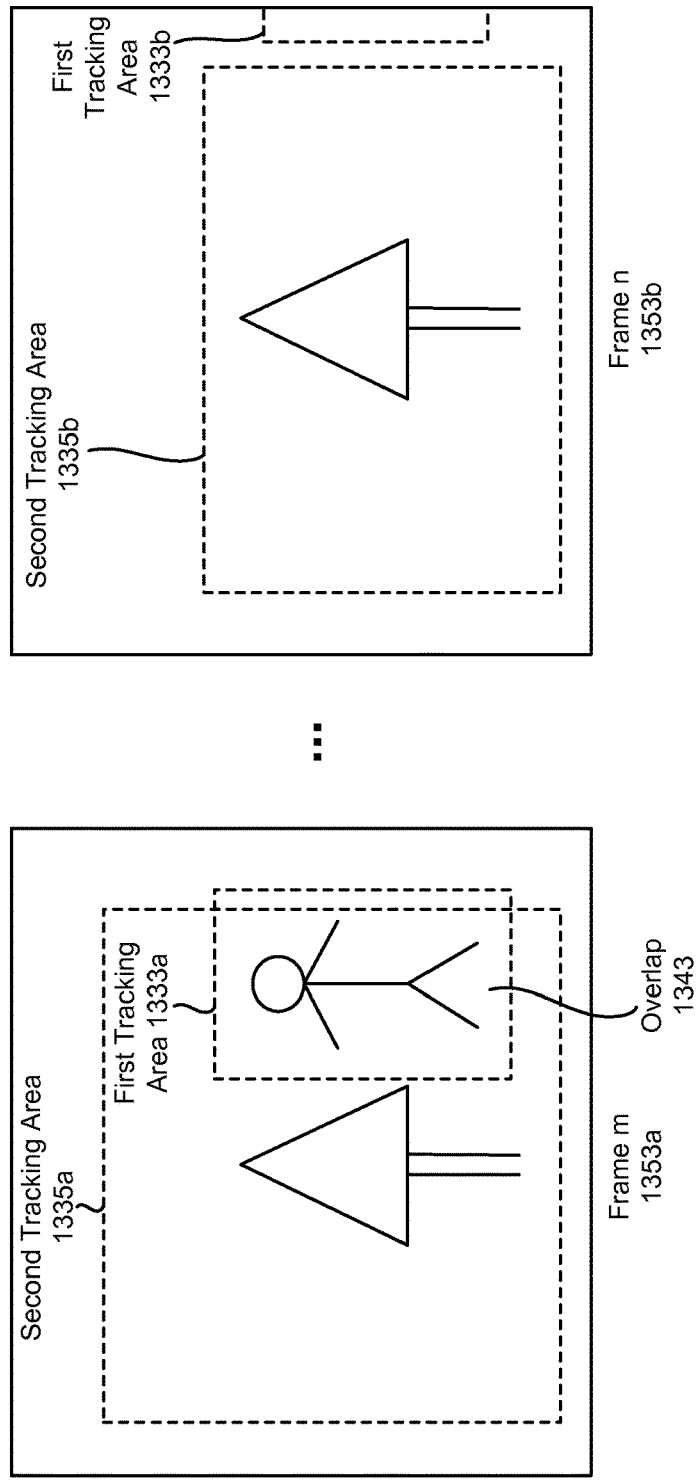
FIG. 13 illustrates another example of picture processing using object tracking.

FIG. 13 illustrates another example of picture processing using object tracking. Multiple frames 1253*a-b* are illustrated. The frames 1253 may be part of a prerecorded video sequence 147 or live frames viewed through a viewfinder 131. In frame n 1353*a*, a first tracking area 1333*a* is illustrated around a walking person and a second tracking area 1335*a* is illustrated around a stationary tree and the area around the tree. A user may desire to take a photograph 149 once the walking person is no longer in view (e.g., a nature shot). In frame m 1353*a*, the second tracking area 1335*a* completely overlaps the first tracking area 1333*a* (i.e., the overlap 1343 is 100%). The electronic device 102 may be configured to perform picture processing once the overlap 1343 reaches 0%. In this configuration, the electronic device 102 may be configured to take a photograph 149 once the overlap 1343 reaches 0%.

In frame n 1353*b*, time has elapsed since frame m 1353*a*. The first tracking area 1333*b* has remained on the walking person and the second tracking area 1335*b* has remained on the stationary tree. Because the walking person has moved, the first tracking area 1333*a* is no longer overlapping the second tracking area 1335*b*. Thus, once the overlap 1343 reaches 0%, the electronic device 102 is configured to take a photograph 149 (in this case, a photograph 149 of the stationary tree without the walking person).

Figure 14:
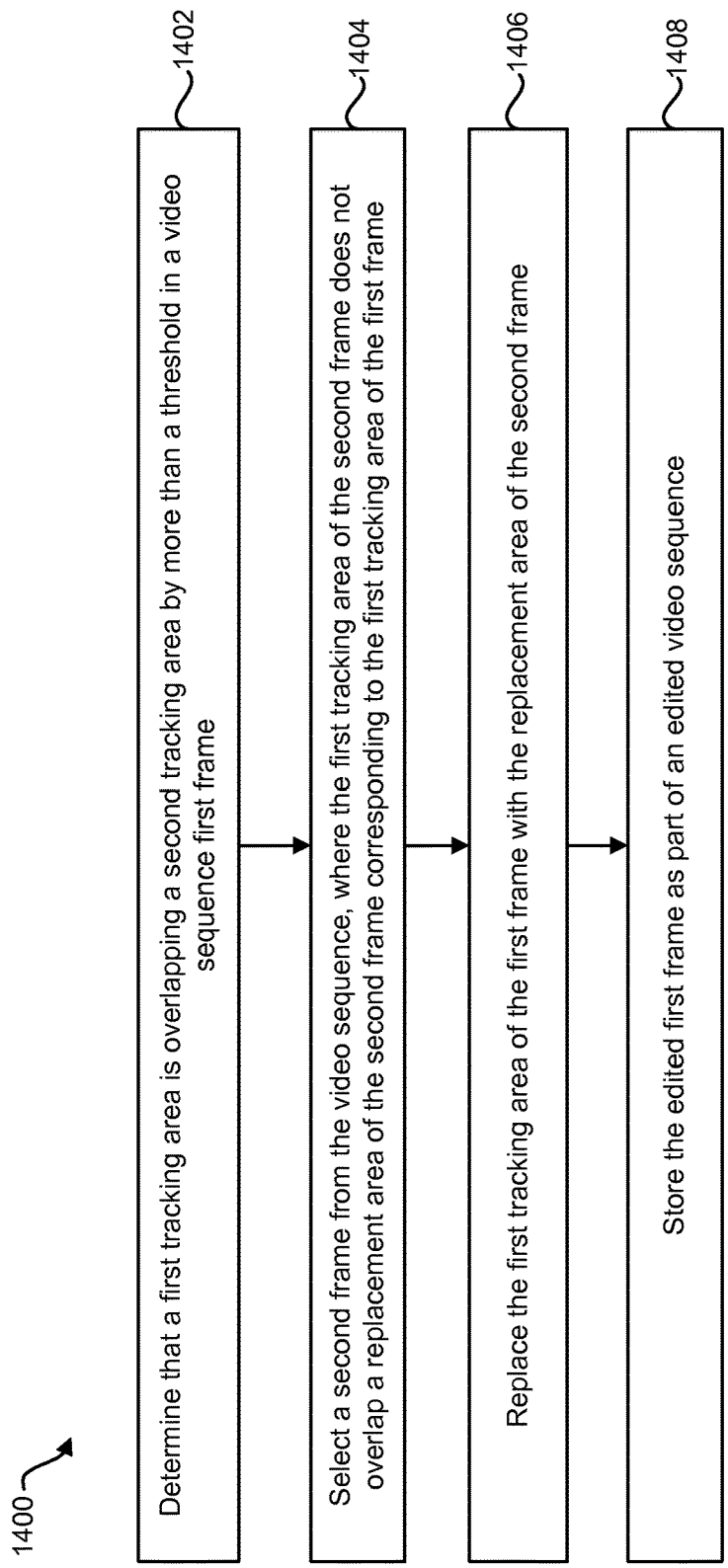
FIG. 14 is a flow diagram of a method for performing picture processing on a video sequence using object tracking.

FIG. 14 is a flow diagram of a method 1400 for performing picture processing on a video sequence 147 using object tracking. The method 1400 may be performed by an electronic device 102. A user may select multiple tracking areas on the electronic device 102 for the picture processing. The electronic device 102 may determine 1402 that a first tracking area 133 is overlapping 143 a second tracking area 135 by more than a threshold 145 in a video sequence 147 first frame. The electronic device 102 may select 1404 a second frame from the video sequence 147. The second frame may be selected such that the first tracking area 133 of the second frame does not overlap a replacement area of the second frame, which corresponds to the first tracking area 133 of the first frame. The replacement area of the second frame may reflect the position of the first tracking area 133 in the first frame. Thus, the replacement area may show the background behind the first tracking area 133. The second frame may be a frame that occurs before or after the first frame.

The electronic device 102 may replace 1406 the first tracking area 133 of the first frame with the corresponding replacement area of the second frame. The electronic device 102 may store 1408 the edited first frame as part of an edited video sequence 151.

Figure 15:
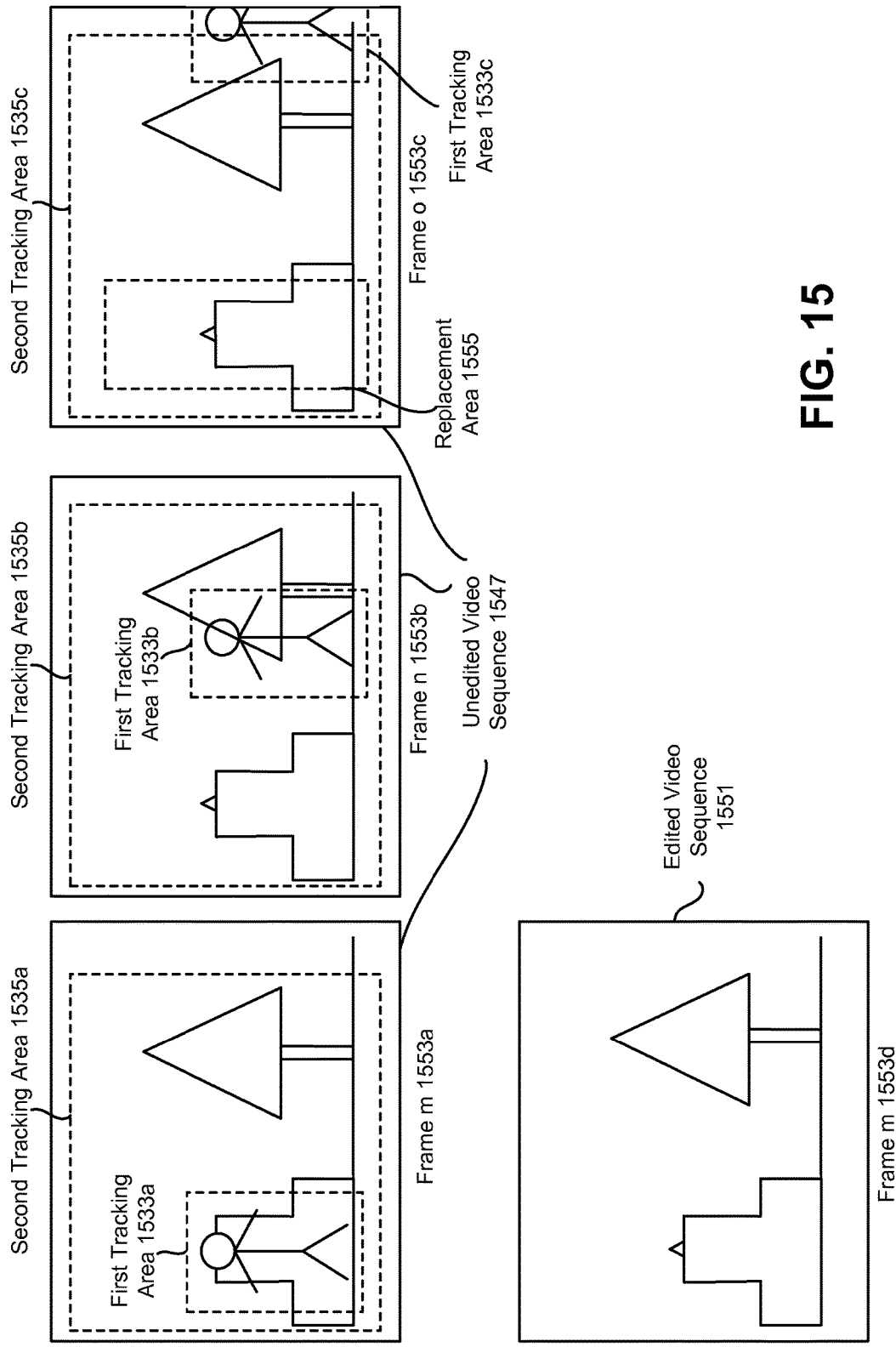
FIG. 15 illustrates multiple frames of both an unedited video sequence and an edited video sequence displayed on an electronic device.

FIG. 15 illustrates multiple frames 1553a-d of both an unedited video sequence 1547 and an edited video sequence 1551 displayed on an electronic device 102. Picture processing using object tracking may be performed on the unedited video sequence 1547 to obtain the edited video sequence 1551. Frame m 1553a, frame n 1553b and frame o 1553c of the unedited video sequence 1547 are illustrated. Although the frames 1553a-c are sequential (frame n 1553b occurs after frame m 1553a), additional frames (not shown) may occur between the frames 1553a-c (e.g., frame n 1553b may not be the immediate frame following frame m 1553a).

Frame m 1553a includes a walking person and a stationary tree. A user may select a first tracking area 1533a that includes the walking person and a second tracking area 1535a that includes the stationary tree and the walking person using the electronic device 102. In one configuration, the second tracking area 1535a may be configured as stationary. The user may also configure the electronic device 102 to remove the walking person from the unedited video sequence 1547.

The picture processing may be configured to replace the first tracking area 1533a of frame m 1553a with a replacement area 1555 from another frame 1553 once the first tracking area 1533 does not overlap the second tracking area 1535. In other words, the walking person in frame m 1553a may be replaced with the background behind the walking person once the walking person has moved enough to expose the background. In this configuration, the picture processing may be performed once the overlap 143 reaches 0%.

Frame n 1553b includes the walking person (encircled by the moving first tracking area 1533b) and the stationary tree (encircled by the stationary second tracking area 1535b). Because the first tracking area 1533b of frame n 1553b overlaps the second tracking area 1535b of frame n 1553b, frame n 1553b may not be selected as a suitable frame for replacement in frame m 1553a.

Frame o 1553c includes the walking person (encircled by the moving first tracking area 1533c) and the stationary tree (encircled by the stationary second tracking area 1535c). Because the first tracking area 1533c of frame o 1553c does not overlap the second tracking area 1535c of frame o 1553c, frame o 1553c may be selected for replacement in frame m 1553a. Frame o 1553c includes a replacement area 1555. The replacement area 1555 may correspond with the first tracking area 1533a of frame m 1553a. Thus, the replacement area 1555 may include the background behind the walking person that is obscured in frame m 1553a. The picture processing may replace the first tracking area 1533a of frame m 1553a with the replacement area 1555 of frame o 1553c. Thus, in the edited video sequence 1551, frame m 1553d is illustrated with the walking person removed.

Figure 16:
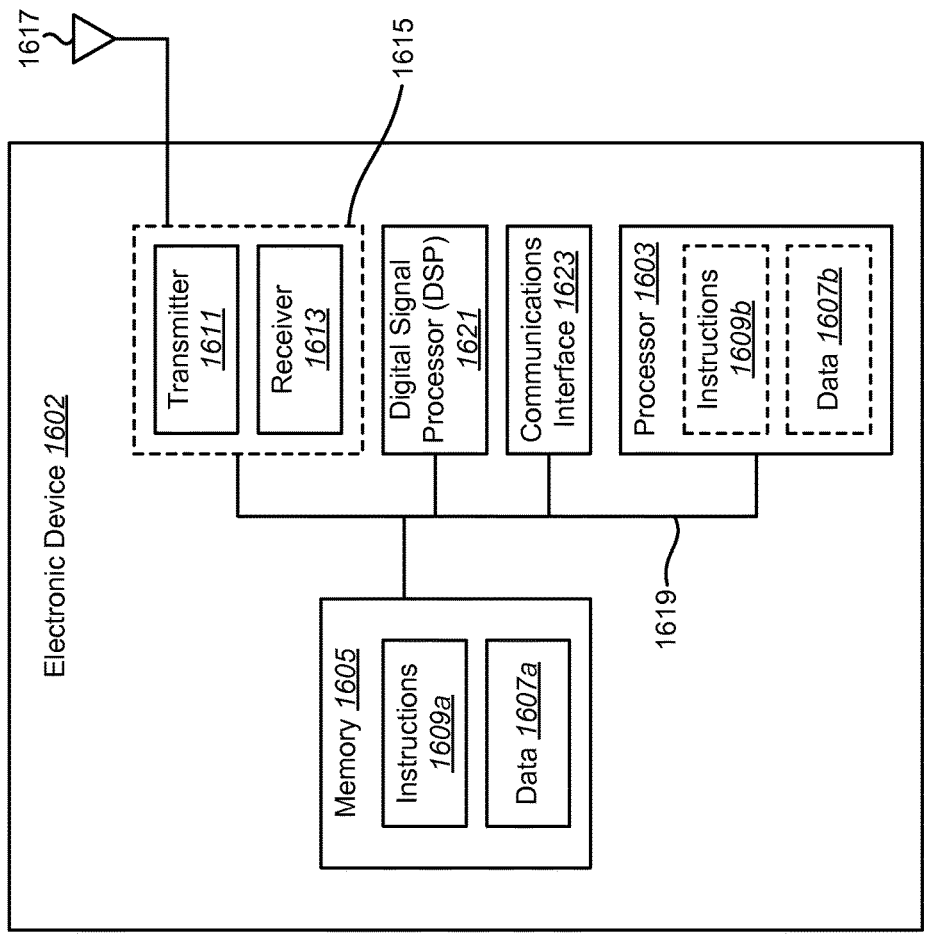
FIG. 16 illustrates certain components that may be included within an electronic device.

FIG. 16 illustrates certain components that may be included within an electronic device 1602. The electronic device 1602 may be a mobile station, a user equipment (UE), an access point, etc., such as the electronic device 102 illustrated in FIG. 1. The electronic device 1602 includes a processor 1603. The processor 1603 may be a general purpose single- or multi-chip microprocessor (e.g., an ARM), a special purpose microprocessor (e.g., a digital signal processor (DSP)), a microcontroller, a programmable gate array, etc. The processor 1603 may be referred to as a central processing unit (CPU). Although just a single processor 1603 is shown in the electronic device 1602, in an alternative configuration, a combination of processors 1603 (e.g., an ARM and DSP) could be used.

The electronic device 1602 also includes memory 1605. The memory 1605 may be any electronic component capable of storing electronic information. The memory 1605 may be embodied as random access memory (RAM), read-only memory (ROM), magnetic disk storage media, optical storage media, flash memory devices in RAM, on-board memory included with the processor, EPROM memory, EEPROM memory, registers, and so forth, including combinations thereof.

Data 1607a and instructions 1609a may be stored in the memory 1605. The instructions 1609a may be executable by the processor 1603 to implement the methods disclosed herein. Executing the instructions 1609a may involve the use of the data 1607a that is stored in the memory 1605. When the processor 1603 executes the instructions 1609a, various portions of the instructions 1609b may be loaded onto the processor 1603, and various pieces of data 1607a may be loaded onto the processor 1603.

The electronic device 1602 may also include a transmitter 1611 and a receiver 1613 to allow transmission and reception of signals to and from the electronic device 1602. The transmitter 1611 and receiver 1613 may be collectively referred to as a transceiver 1615. An antenna 1617 may be electrically coupled to the transceiver 1615. The electronic device may also include (not shown) multiple transmitters, multiple receivers, multiple transceivers and/or additional antennas.

The electronic device 1602 may include a digital signal processor (DSP) 1621. The electronic device 1602 may also include a communications interface 1623. The communications interface 1623 may allow a user to interact with the electronic device 1602.

The various components of the electronic device 1602 may be coupled together by one or more buses, which may include a power bus, a control signal bus, a status signal bus, a data bus, etc. For the sake of clarity, the various buses are illustrated in FIG. 16 as a bus system 1619.

The techniques described herein may be used for various communication systems, including communication systems that are based on an orthogonal multiplexing scheme. Examples of such communication systems include Orthogonal Frequency Division Multiple Access (OFDMA) systems, Single-Carrier Frequency Division Multiple Access (SC-FDMA) systems, and so forth. An OFDMA system utilizes orthogonal frequency division multiplexing (OFDM), which is a modulation technique that partitions the overall system bandwidth into multiple orthogonal sub-carriers. These sub-carriers may also be called tones, bins, etc. With OFDM, each sub-carrier may be independently modulated with data. An SC-FDMA system may utilize interleaved FDMA (IF-DMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA.

In accordance with the present disclosure, a circuit, in an electronic device, may be adapted to perform motion-based tracking for a current video frame by comparing a previous video frame and the current video frame. The same circuit, a different circuit, or a second section of the same or different circuit may be adapted to perform object detection in the current video frame based on a tracked parameter. The second section may advantageously be coupled to the first section, or it may be embodied in the same circuit as the first section. In addition, the same circuit, a different circuit, or a third section of the same or different circuit may be adapted to control the configuration of the circuit(s) or section(s) of circuit(s) that provide the functionality described above.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The term "processor" should be interpreted broadly to encompass a general purpose processor, a central processing unit (CPU), a microprocessor, a digital signal processor (DSP), a controller, a microcontroller, a state machine, and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a DSP and a microprocessor, a plurality of microprocessors, one or more microprocessors in conjunction with a DSP core, or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read-only memory (EPROM), electrically erasable PROM (EEPROM), flash memory, magnetic or optical data storage, registers, etc. Memory is said to be in electronic communication with a processor if the processor can read information from and/or write information to the memory. Memory that is integral to a processor is in electronic communication with the processor.

The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may comprise a single computer-readable statement or many computer-readable statements.

The functions described herein may be implemented in software or firmware being executed by hardware. The functions may be stored as one or more instructions on a computer-readable medium. The terms "computer-readable medium" or "computer-program product" refers to any tangible storage medium that can be accessed by a computer or a processor. By way of example, and not limitation, a computer-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray® disc where disks usually reproduce data magnetically, while discs reproduce data optically with lasers. It should be noted that a computer-readable medium may be tangible and non-transitory. The term "computer-program product" refers to a computing device or processor in combination with code or instructions (e.g., a "program") that may be executed, processed or computed by the computing device or processor. As used herein, the term "code" may refer to software, instructions, code or data that is/are executable by a computing device or processor.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio and microwave, then the coaxial cable, fiber optic cable, twisted pair, DSL, or wireless technologies such as infrared, radio and microwave are included in the definition of transmission medium.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

Further, it should be appreciated that modules and/or other appropriate means for performing the methods and techniques described herein, such as those illustrated by FIGS. 2A, 2B, 3-6, 10, 11 and 14, can be downloaded and/or otherwise obtained by a device. For example, a device may be coupled to a server to facilitate the transfer of means for performing the methods described herein. Alternatively, various methods described herein can be provided via a storage means (e.g., random access memory (RAM), read-only memory (ROM), a physical storage medium such as a compact disc (CD) or floppy disk, etc.), such that a device may obtain the various methods upon coupling or providing the storage means to the device.

It is to be understood that the claims are not limited to the precise configuration and components illustrated above. Various modifications, changes and variations may be made in the arrangement, operation and details of the systems, methods, and apparatus described herein without departing from the scope of the claims.

What is claimed is:

1. A method for picture processing, comprising:
receiving a user selection of a first tracking area;
receiving a user selection of a second tracking area;
beginning to track the first tracking area and the second tracking area;
determining, in a first frame, an amount of overlap between the first tracking area of a first tracked object captured in the first frame and the second tracking area of a second tracked object captured in the first frame, wherein determining the amount of overlap is based on whether the first tracking area is larger than the second tracking area; and
performing picture processing in response to determining that the amount of overlap passes a threshold.

2. The method of claim 1, wherein the picture processing is performed once the amount of overlap becomes greater than the threshold.

3. The method of claim 1, wherein the picture processing is performed once the amount of overlap becomes less than the threshold.

4. The method of claim 1, wherein the picture processing comprises capturing a photograph, wherein the photograph is captured from prerecorded video footage.

5. The method of claim 1, wherein the picture processing comprises capturing a photograph, wherein the photograph is captured from live footage.

6. The method of claim 1, wherein the picture processing comprises editing a video sequence, wherein the first tracked object is removed from the video sequence.

7. The method of claim 6, further comprising:
selecting a second frame of the video sequence, wherein the first tracking area does not overlap a corresponding replacement area in the second frame; and
replacing the first tracking area in the first frame with the corresponding replacement area from the second frame.

8. The method of claim 7, wherein the second frame occurs later in time than the first frame.

9. The method of claim 7, wherein the second frame occurs earlier in time than the first frame.

10. The method of claim 7, further comprising storing the first frame as part of an edited video sequence.

11. The method of claim 1, wherein user selection of the first tracking area and the second tracking area are entered by a user via a focus ring.

12. The method of claim 11, wherein beginning to track the first tracking area and the second tracking area occurs after the user has released a finger from a touchscreen.

13. The method of claim 1, wherein the second tracking area comprises an action line.

14. An electronic device configured for picture processing, comprising:
a processor;
memory in electronic communication with the processor;
instructions stored in memory, the instructions being executable to:
receive a user selection of a first tracking area;
receive a user selection of a second tracking area;
begin to track the first tracking area and the second tracking area;
determine, in a first frame, an amount of overlap between the first tracking area of a first tracked object captured in the first frame and the second tracking area of a second tracked object captured in the first frame, wherein the instructions are executable to determine the amount of overlap based on whether the first tracking area is larger than the second tracking area; and
perform picture processing in response to determining that the amount of overlap passes a threshold.

15. The electronic device of claim 14, wherein the picture processing is performed once the amount of overlap becomes greater than the threshold.

16. The electronic device of claim 14, wherein the picture processing is performed once the amount of overlap becomes less than the threshold.

17. The electronic device of claim 14, wherein the picture processing comprises capturing a photograph, wherein the photograph is captured from prerecorded video footage.

18. The electronic device of claim 14, wherein the picture processing comprises capturing a photograph, wherein the photograph is captured from live footage.

19. The electronic device of claim 14, wherein the picture processing comprises editing a video sequence, wherein the first tracked object is removed from the video sequence.

20. The electronic device of claim 19, wherein the instructions are further executable to:
select a second frame of the video sequence, wherein the first tracking area does not overlap a corresponding replacement area in the second frame; and
replace the first tracking area in the first frame with the corresponding replacement area from the second frame.

21. The electronic device of claim 20, wherein the second frame occurs later in time than the first frame.

22. The electronic device of claim 20, wherein the second frame occurs earlier in time than the first frame.

23. The electronic device of claim 20, wherein the instructions are further executable to store the first frame as part of an edited video sequence.

24. The electronic device of claim 14, wherein user selection of the first tracking area and the second tracking area are entered by a user via a focus ring.

25. The electronic device of claim 24, wherein beginning to track the first tracking area and the second tracking area occurs after the user has released a finger from a touchscreen.

26. The electronic device of claim 14, wherein the second tracking area comprises an action line.

27. An apparatus for picture processing, comprising:
means for receiving a user selection of a first tracking area;
means for receiving a user selection of a second tracking area;
means for beginning to track the first tracking area and the second tracking area;
means for determining, in a first frame, an amount of overlap between the first tracking area of a first tracked object captured in the first frame and the second tracking area of a second tracked object captured in the first frame, wherein the means for determining the amount of overlap is based on whether the first tracking area is larger than the second tracking area; and
means for performing picture processing in response to determining that the amount of overlap passes a threshold.

28. The apparatus of claim 27, wherein the picture processing is performed once the amount of overlap becomes greater than the threshold.

29. The apparatus of claim 27, wherein the picture processing is performed once the amount of overlap becomes less than the threshold.

30. The apparatus of claim 27, wherein the picture processing comprises editing a video sequence, wherein the first tracked object is removed from the video sequence.

31. The apparatus of claim 30, further comprising:
means for selecting a second frame of the video sequence, wherein the first tracking area does not overlap a corresponding replacement area in the second frame; and
means for replacing the first tracking area in the first frame with the corresponding replacement area from the second frame.

32. A computer-program product for picture processing, comprising a non-transitory computer-readable medium having instructions thereon, the instructions comprising:
code for causing an electronic device to receive a user selection of a first tracking area;
code for causing the electronic device to receive a user selection of a second tracking area;

code for causing the electronic device to begin to track the first tracking area and the second tracking area;

code for causing the electronic device to determine, in a first frame, an amount of overlap between the first tracking area of a first tracked object captured in the first frame and the second tracking area of a second tracked object captured in the first frame, wherein the code for causing the electronic device to determine the amount of overlap is based on whether the first tracking area is larger than the second tracking area; and code for causing the electronic device to perform picture processing in response to determining that the amount of overlap passes a threshold.

33. The computer-program product of claim 32, wherein the picture processing is performed once the amount of overlap becomes greater than the threshold.

34. The computer-program product of claim 32, wherein the picture processing is performed once the amount of overlap becomes less than the threshold.

35. The computer-program product of claim 32, wherein the picture processing comprises editing a video sequence, wherein the first tracked object is removed from the video sequence.

36. The computer-program product of claim 35, the instructions further comprising:

code for causing the electronic device to select a second frame of the video sequence, wherein the first tracking area does not overlap a corresponding replacement area in the second frame; and code for causing the electronic device to replace the first tracking area in the first frame with the corresponding replacement area from the second frame.

37. The method of claim 1, further comprising displaying a first user-interface element representative of the first tracking area, wherein the first user-interface element changes appearance depending on a tracking state.

38. The method of claim 1, further comprising:

displaying a first user-interface element representative of the first tracking area; and displaying a second user-interface element representative of the second tracking area.

39. The electronic device of claim 14, wherein the instructions are executable to:

display a first user-interface element representative of the first tracking area; and display a second user-interface element representative of the second tracking area.

40. The apparatus of claim 27, further comprising:

means for displaying a first user-interface element representative of the first tracking area; and means for displaying a second user-interface element representative of the second tracking area.

41. The computer-program product of claim 32, further comprising:

code for causing the electronic device to display a first user-interface element representative of the first tracking area; and code for causing the electronic device to display a second user-interface element representative of the second tracking area.

* * * * *